US008340282B2

(12) United States Patent
Shirai

(10) Patent No.: US 8,340,282 B2
(45) Date of Patent: Dec. 25, 2012

(54) INFORMATION PROCESSING APPARATUS

(75) Inventor: Taizo Shirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 11/909,544

(22) PCT Filed: Mar. 2, 2006

(86) PCT No.: PCT/JP2006/304015
§ 371 (c)(1),
(2), (4) Date: Dec. 15, 2008

(87) PCT Pub. No.: WO2006/103867
PCT Pub. Date: Oct. 5, 2006

(65) Prior Publication Data
US 2009/0103716 A1 Apr. 23, 2009

(30) Foreign Application Priority Data

Mar. 25, 2005 (JP) ................. 2005-088952
Oct. 28, 2005 (JP) ................. 2005-313842

(51) Int. Cl.
*H04L 29/06* (2006.01)
(52) U.S. Cl. ........................................ 380/29
(58) Field of Classification Search .............. 380/29
See application file for complete search history.

(56) References Cited

U.S. PATENT DOCUMENTS

2005/0111659 A1  5/2005  Shirai

FOREIGN PATENT DOCUMENTS

JP  2005-107078  4/2005
JP  2006-072054  3/2006

OTHER PUBLICATIONS

Shirai et al. "On Feistel Ciphers Using Optimal Diffusion Mappings Across Multiple Rounds", ASIACRYPT 2004, LNCS 3329 pp. 1-15, 2004.*
Kanda, "Practical Security Evaluation against Differential and Linear Cryptanalyses for Feistel Ciphers with SPN Round Function" pp. 324-338, NTT Information Sharing Platform Laboratories, 2001.*

(Continued)

*Primary Examiner* — Farid Homayounmehr
*Assistant Examiner* — Lisa Lewis
(74) *Attorney, Agent, or Firm* — Finnegan, Henderson, Farabow, Garrett & Dunner, L.L.P.

(57) ABSTRACT

A high-security cryptanalysis-resistant cryptographic processing apparatus and a cryptographic processing method are provided. A Feistel common key block cipher is produced by repeatedly performing an SPN-type F-function including a nonlinear transformation part and a linear transformation part over a plurality of rounds. In each round, a linear transformation process is performed according to an F-function using a matrix determined so as to satisfy a relatively loose constraint whereby high resistance to differential attacks and/or linear attacks is achieved. The relatively loose constraint allows an increase in the number of candidates for usable matrices, and it is possible to maintain the number of active S-boxes to a sufficiently large level. This makes it possible to increase the minimum number of active S-boxes, which is one of measures indicating the degree of robustness of ciphers, and thus it is possible to realize an algorithm of encrypting data in a highly secure manner so that high resistance to attacks is achieved.

8 Claims, 18 Drawing Sheets

OTHER PUBLICATIONS

Shirai et al., "Improving Immunity of Feistel Ciphers against Differential Cryptanalysis by using Multiple MDS Matrices", Ubiquitous Technology Laboratories, 2003-2004. pp. 1-19.*

Masayuki Kanda et al., "On the Design of Linear Transformation Layers for SPN Structures", Transactions of Information Processing Society of Japan, vol. 42, No. 42, Aug. 15, 2001, pp. 2087 to 2097.

* cited by examiner

FIG. 8 example) $n = 8, m = 8$ $$\begin{pmatrix} 9d & b4 & d3 & 5d & 84 & ae & ec & b9 \\ 29 & 34 & 39 & 60 & 5c & 81 & 25 & 13 \\ 67 & 6a & d2 & e3 & 4b & db & 9d & 4 \\ 8e & d7 & e6 & 1b & 8b & 9e & 3a & 91 \\ d9 & e5 & 4d & dd & c6 & 5 & f0 & ad \\ 2a & f7 & 67 & 72 & b1 & 7 & f2 & 27 \\ 42 & e6 & a0 & 4 & f1 & 4 & 7d & 8c \\ 55 & 63 & fa & 51 & c & d9 & 28 & d6 \end{pmatrix}$$

EXAMPLE OF SETTING FOR $r = 6$ AND $q = 3$

IN THE CASE OF q = 6, n = 8, AND m = 8

IN THE CASE OF q = 6, n = 8, AND m = 8

IN THE CASE OF $q = 6$, $n = 8$, AND $m = 8$

INFORMATION PROCESSING APPARATUS

TECHNICAL FIELD

The present invention relates to a cryptographic processing apparatus, a cryptographic processing method, and a computer program. More specifically, the present invention relates to a cryptographic processing apparatus, a cryptographic processing method, and a computer program, having improved resistance to a cryptanalysis or an attack based on a linear cryptanalysis or a differential cryptanalysis.

BACKGROUND ART

With increasing progress and popularity of network communications and e-commerce in recent years, it has become very important to achieve high security in communication. One method to achieve high security is to use encryption in communication, and many encryption techniques are used in actual communication systems.

For example, there is a known system in which a cryptographic processing module is disposed in a small-sized apparatus such as an IC card whereby, when data is transmitted between the IC card and a data reader/writer, processing including authentication and encryption/decryption of data is performed.

Various cryptographic algorithms are known. They can be roughly classified into public hey cryptography and common key cryptography. In the public key cryptography, different keys are used for encryption and decryption. For example, a public key is used for encryption, and a private key is used for decryption. In the common key cryptography, the same key is used for encryption and decryption.

Various algorithms of common key cryptography are known. In one of such algorithms, a plurality of keys are produced based on a common key, and a data transformation is performed repeatedly in units of blocks (each block including, for example, 64 bits or 128 bits) using the produced keys. Common key block cryptography is a typical example of cryptography using such an algorithm including producing keys and perforating data transformation.

A typical common key encryption scheme is that according to the DES (Data Encryption Standard) adopted as one of Federal Information Processing Standards, and is widely used in various fields.

Common key block encryption algorithms typified by the DES algorithm include two main parts. One part is a round function which transforms input data, and the other part is a key schedule which produces keys used in respective rounds by the round function (F-function). Round keys (subkeys) used in respective rounds of the round function are produced by the key schedule part on the basis of a single master key input to the key schedule part, and used in the respective rounds of the round function.

A problem with the common key cryptography is leakage of keys by cryptanalysis. In a typical method of an attack or a cryptanalysis, a great number of input data (plaintext) having particular differences and corresponding output data (ciphertext) are analyzed to find keys used in respective round functions (this method is known as a differential cryptanalysis or a differential attack). It is also known to perform a cryptanalysis based on plaintext and corresponding ciphertext (this method is known as a linear cryptanalysis or a linear attack).

If a key used to produce a cipher can be easily found via a cryptanalysis, the cipher cannot be high in security. In conventional DES algorithms, a process performed by a linear transformation part of a round function (function) is the same for all rounds (that is, the same transformation matrix is used for all rounds). This makes it possible to easily analyze the algorithm and thus easily find keys.

DISCLOSURE OF INVENTION

Problems to be Solved by the Invention

In view of the above-described problems, it is an object of the present invention to provide a cryptographic processing apparatus, a cryptographic processing method, and a computer program, based on a common key block encryption algorithm that provides high resistance to a cryptanalysis or an attack based on a linear cryptanalysis and/or a differential cryptanalysis.

Means for Solving the Problems

According to a first aspect of the present invention, there is provided a cryptography processing apparatus adapted to perform a Feistel cryptographic process including a nonlinear transformation part including a plurality of nonlinear transformation layers each having an input and an output of a plurality of bits, and a linear transformation part including a linear transformation layer adapted to perform a linear transformation process, wherein the linear transformation part performs the linear transformation process using matrices satisfying a constraint condition.

In an embodiment of the cryptographic processing apparatus according to the present invention, the constraint condition imposed on matrices used in the linear transformation process is given as follows:

when parameters are defined such that for a matrix $M_i$ implementing a mapping $\theta: \{0, 1\}^{na} \to \{0, 1\}^{nb}$ which performs a linear transformation from n×a bit data into n×b bit data in the linear transformation part using an F-function in each of r rounds, the number of branches $B(\theta)$ is defined by $$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BD_1$ and $BD_2$ are defined by $$BD_1 = \min\{B(M_i) | 1 \leq i \leq r\}, \text{ and}$$

$$BD_2 = \min\{B(M_i|M_{i+2}) | 1 \leq i \leq r-2\}$$

where B(M) denotes the number of branches of a matrix M, and A|B denotes a matrix obtained by connecting matrices A and B, the matrix $M_i$ is determined so that $BD_1$ and $BD_2$ are both equal to or greater than 3.

According to a second aspect or the present invention, there is provided a cryptographic processing apparatus configured to perform cryptographic process using an r-round Feistel common key block cipher structure including an SPN-type F-function including a nonlinear transformation part and a linear transformation part, wherein the linear transformation part of the F-function in each of r rounds uses a matrix $M_i$ satisfying the following condition:

when parameters are defined such that for a mapping $\theta: \{0, 1\}^{na} \rightarrow \{0, 1\}^{nb}$ which performs a linear transformation from n×a bit data into n×b-bit data, the number of branches $B(\theta)$ is defined by $$B(\theta) = \min_{\alpha \neq 0} \{hw_n(\alpha) + hw_n(\theta(\alpha))\}$$

where $\min_{\alpha \neq 0} \{X_\alpha\}$ denotes a minimum value of all values of $X_\alpha$ satisfying $\alpha \neq 0$, and $hw_n(Y)$ is a function which splits at given bit string Y into n-bit elements and returns the number of non-zero elements including at least one non-zero bit, a mapping $\theta$ satisfying $B(\theta)=b+1$ is defined as an optimal diffusion mapping, where $B(\theta)$ is the number of branches defined above, and $BD_1$, $BD_2$, and $BD_3$ are defined by $$BD_1 = \min\{B(M_i) | 1 \leq i \leq r\},$$

$$BD_2 = \min\{B(M_i | M_{i+2}) | 1 \leq i \leq r-2\}, \text{ and}$$

$$BD_3 = \min\{B(M_i | M_{i+2} | M_{i+4}) | 1 \leq i \leq r-4\}$$

where B(M) denotes the number of branches of a matrix M, and A|B denotes a matrix obtained by connecting matrices A and B, the matrix $M_i$ is determined so that $BD_1$, $BD_2$, and $BD_3$ are all equal to or greater than 3.

According to a third aspect of the present invention, there is provided a cryptographic processing apparatus configured to perform cryptographic process using an r-round Feistel common key block cipher structure including an SPN-type F-function including a nonlinear transformation part and a linear transformation part, wherein the linear transformation part of the F-function in each of r rounds uses a matrix $M_i$ satisfying the following condition:

when parameters are defined such that for a mapping $\theta: \{0, 1\}^{na} \rightarrow \{0, 1\}^{nb}$ which performs a linear transformation from n×a bit data into n×b-bit data, the number of branches $B(\theta)$ is defined by $$B(\theta) = \min_{\alpha \neq 0} \{hw_n(\alpha) + hw_n(\theta(\alpha))\}$$

where $\min_{\alpha \neq 0} \{X_\alpha\}$ denotes a minimum value of all values of $X_\alpha$ satisfying $\alpha \neq 0$, and $hw_n(Y)$ is a function which splits a given bit string Y into n-bit elements and returns the number of non-sera elements including at least one non-zero bit, a mapping $\theta$ satisfying $B(\theta)=b+1$ is defined as an optimal diffusion mapping, where $B(\theta)$ is the number of branches defined above, and $BL_2$ is defined by $$BL_2 = \min\{B({}^tM^{-1}_i | {}^tM^{-1}_{i+2}) | 1 \leq i \leq r-2\}$$

where B(M) denotes the number of branches of a matrix M, and ${}^tM$ denotes a transposed matrix of M, the matrix $M_i$ is determined so that $BL_2$ is equal to or greater than 3.

According to a fourth aspect of the present invention, there is provided a cryptographic processing method for executing a cryptographic process using a Feistel common key block structure, comprising the step of executing an SPN-type F-function including a nonlinear transformation part and a linear transformation part repeatedly over r rounds, wherein in each round, the linear transformation part performs a linear transformation using the F-function according to a matrix Mi satisfying the following condition:

when parameters are defined such that for a mapping $\theta: \{0, 1\}^{na} \rightarrow \{0, 1\}^{nb}$ which performs a linear transformation from n×a bit data into n×b-bit data, the number of branches $B(\theta)$ is defined by $$B(\theta) = \min_{\alpha \neq 0} \{hw_n(\alpha) + hw_n(\theta(\alpha))\}$$

where $\min_{\alpha \neq 0} \{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta)=b+1$ is defined as an optimal diffusion mapping, where $B(\theta)$ is the number of branches defined above, and $BD_1$, $BD_2$, and $BD_3$ are defined by $$BD_1 = \min\{B(M_i) | 1 \leq i \leq r\},$$

$$BD_2 = \min\{B(M_i | M_{i+2}) | 1 \leq i \leq r-2\}, \text{ and}$$

$$BD_3 = \min\{B(M_i | M_{i+2} | M_{i+4}) | 1 \leq i \leq r-4\}$$

where B(M) denotes the number of branches of a matrix M, and A|B denotes a matrix obtained by connecting matrices A and B, the matrix $M_i$ is determined so that $BD_1$, $BD_2$, and $BD_3$ are all equal to or greater than 3.

According to a fifth aspect of the present invention, there is provided a cryptographic processing method for executing a cryptographic process using a Feistel common key block structure, comprising the step of executing an SPN-type F-function including a nonlinear transformation part and a linear transformation part repeatedly over r rounds, wherein in each round, the linear transformation part performs a linear transformation using the F-function according to a matrix Mi satisfying the following condition;

when parameters are defined such that for a mapping $\theta: \{0, 1\}^{na} \rightarrow \{0, 1\}^{nb}$ which performs a Linear transformation from n×a bit data into n×b-bit data, the number of branches $B(\theta)$ is defined by $$B(\theta) = \min_{\alpha \neq 0} \{hw_n(\alpha) + hw_n(\theta(\alpha))\}$$

where $\min_{\alpha \neq 0} \{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, at mapping $\theta$ satisfying $B(\theta)=b+1$ is defined as an optimal diffusion mapping, where $B(\theta)$ is the number of branches defined above, and $BL_2$ is defined by $$BL_2 = \min\{B({}^tM^{-1}_i | {}^tM^{-1}_{i+2}) | 1 \leq i \leq r-2\}$$

where B(M) denotes the number of branches of a matrix M, and ${}^tM$ denotes a transposed matrix of M, the matrix $M_i$ is determined so that $BL_2$ is equal to or greater than 3.

According to a sixth aspect of the present invention, there is provided a computer program executable on a computer to perform a cryptographic process using a Feistel common key block structure, comprising the step of executing an SPN-type F-function including a nonlinear transformation part and a linear transformation part repeatedly over r rounds, wherein in each round, the linear transformation part performs a linear transformation using the F-function according to a matrix Mi satisfying the following condition:

when parameters are defined such that for a mapping θ: $\{0, 1\}^{na} \rightarrow \{0, 1\}^{nb}$ which performs a linear transformation from n×a bit data into n×b-bit data, the number of branches B(θ) is defined by $$B(\theta) = \min_{\alpha \neq 0} \{hw_n(\alpha) + hw_n(\theta(\alpha))\}$$

where $\min_{\alpha \neq 0} \{X_\alpha\}$ denotes a minimum value of all values of $X_\alpha$ satisfying α≠0, and $hw_n(Y)$ is a function which splits a given bit string Y into n-bit elements and returns the number of non-zero elements including at least one non-zero bit, a mapping θ satisfying B(θ)=b+1 is defined as an optimal diffusion mapping, where B(θ) is the number of branches defined above, and $BD_1$, $BD_2$, and $BD_3$ are defined by $$BD_1 = \min\{B(M_i) | 1 \leq i \leq r\},$$

$$BD_2 = \min\{B(M_i | M_{i+2}) | 1 \leq i \leq r-2\}, \text{ and}$$

$$BD_3 = \min\{B(M_i | M_{i+2} | M_{i+4}) | 1 \leq i \leq r-4\}$$

where B(M) denotes the number of branches of a matrix M, and A|B denotes a matrix obtained by connecting matrices A and B, the matrix $M_i$ is determined that $BD_1$, $BD_2$, and $BD_3$ are all equal to or greater than 3.

According to a seventh aspect of the present invention, there is provided a computer program executable on a computer to perform a cryptographic process using a Feistel common key block structure, comprising the step of executing an SPN-type F-function including a nonlinear transformation part and a linear transformation part repeatedly over r rounds, wherein in each round, the linear transformation part performs a linear transformation using the F-function according to a matrix Mi satisfying the following condition:

when parameters are defined such that for a mapping θ: $\{0, 1\}^{na} \rightarrow \{0, 1\}^{nb}$ which performs a linear transformation from n×a bit data into n×b-bit data, the number of branches B(θ) is defined by $$B(\theta) = \min_{\alpha \neq 0} \{hw_n(\alpha) + hw_n(\theta(\alpha))\}$$

where $\min_{\alpha \neq 0} \{X_\alpha\}$ denotes a minimum value of all values of $X_\alpha$ satisfying α≠0, and $hw_n(Y)$ is a function which splits a given bit string Y into n-bit elements and returns the number of non-zero elements including at least one non-zero bit, a mapping θ satisfying B(θ)=b+1 is defined as an optimal diffusion mapping, where B(θ) is the number of branches defined above, and $BL_2$ is defined by $$BL_2 = \min\{B({}^tM^{-1}_i | {}^tM^{-1}_{i+2}) | 1 \leq i \leq r-2\}$$

where B(M) denotes the number of branches of a matrix M, and ${}^tM$ denotes a transposed matrix of M, the matrix $M_i$ is determined so that $BL_2$ is equal to or greater than 3.

The computer program according to the present invention may be provided to a computer system capable of executing various computer program codes via a storage medium such as a CD, an FD, or an MO on which the program is stored, in a computer-readable manner or via a communication medium such as a network. By providing the program in the computer-readable form as described above, it becomes possible to execute processes on the computer system in accordance with the program.

Further objects, features, and advantages of the present invention will become apparent from the following description of exemplary embodiments with reference to the attached drawings. Note that in the present description, the term "system" is used to describe a logical collection of a plurality of apparatuses, and it is not necessarily required that the plurality of apparatus be disposed in a single case.

Advantages

The present invention provides a Feistel common key block encryption algorithm. In this algorithm, an SPN-type F-function including a nonlinear transformation part and a linear transformation part is performed repeatedly over a plurality of rounds. In the algorithm, a linear transformation process is performed in each of a plurality of rounds in accordance with the F-function using a matrix determined so as to satisfy a relatively loose constraint whereby high resistance of a common key block cipher against differential attacks and/or linear attacks is achieved. The relatively loose constraint allows an increase in the number of candidates for usable matrices, and it is possible to maintain the number of active S-boxes to a sufficiently large level. This makes it possible to increase the minimum, number of active S-boxes as counted over all rounds of the encryption function, which is one of measures of the degree of resistance of common key block ciphers against attacks, and thus it is possible to realise an algorithm of encrypting data in a highly secure manner so that high resistance to linear attacks and differential attacks is achieved.

BRIEF DESCRIPTION OF THE DRAWINGS

FIG. 8 is a diagram illustrating an example of a square MDS matrix.

BEST MODE FOR CARRYING OUT THE INVENTION

Figure 1:
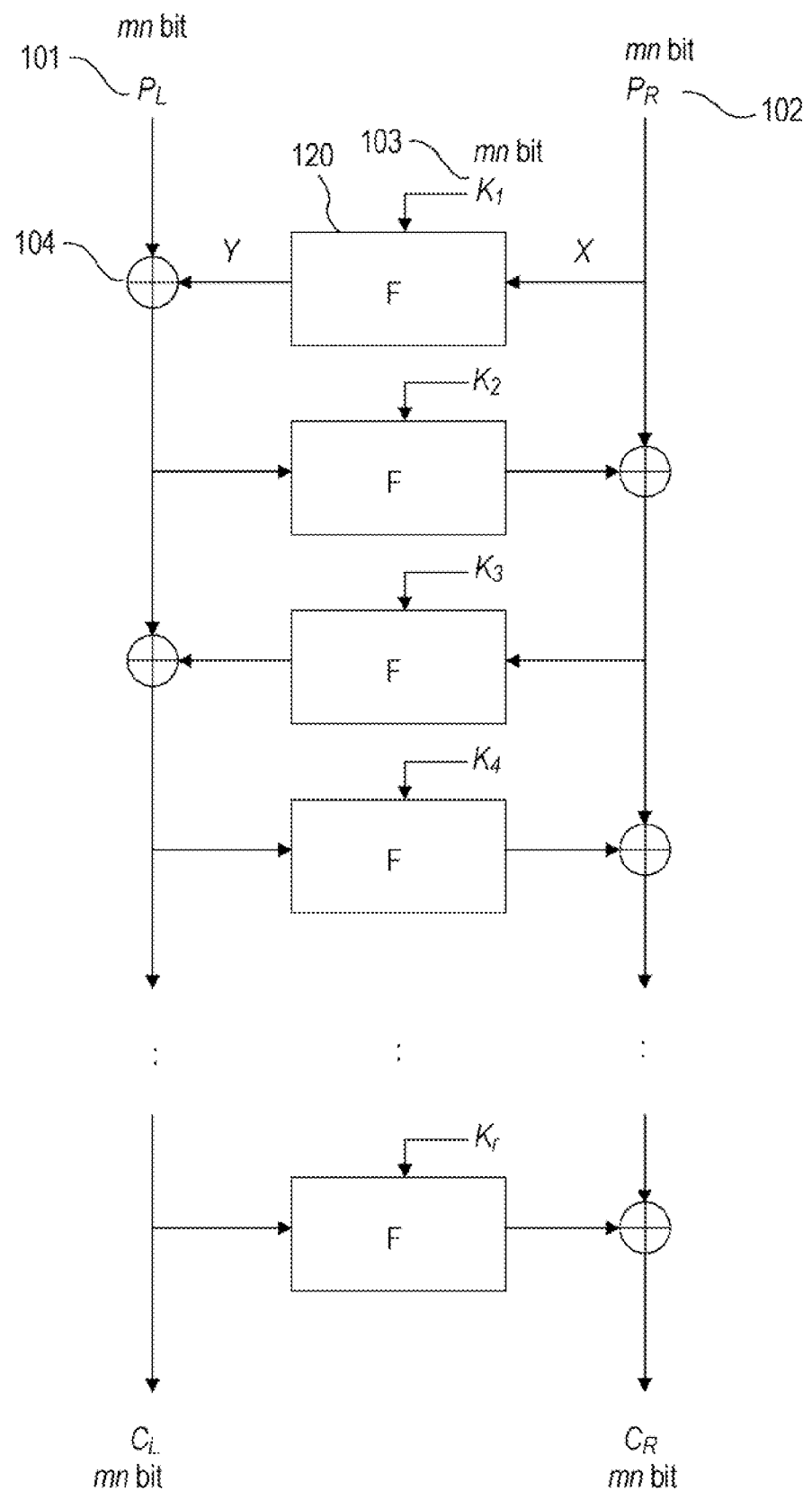
FIG. 1 is a diagram illustrating a typical common key block cipher using a Feistel structure.

The details of the cryptographic processing apparatus, the cryptographic processing method, and the computer program according to the present invention are described below. In the following explanation, the subjects listed below will foe discussed.

1. Differential Cryptanalysis of Common Key Block Encryption Algorithm

2. Linear Cryptanalysis of Common Key Block Encryption Algorithm

3. Examples of Encryption Algorithms with Improved Resistance to Cryptanalysis (3-a) Producing Square MDS Matrices and Applying Them to F-Function Such That high Resistance to Differential Attacks IS Achieved (3b) Producing Square MDS Matrices and Applying Them to F-Function Such That High Resistance to Linear Attacks IS Achieved (3-c) Producing Square MDS Matrices and Applying Them to F-Function Such That High Resistance to Differential Attacks And Linear Attacks IS Achieved 4. Encryption Algorithm According to the Present Invention (4a) Mode 1

(4a. 1) Improvement in Resistance to Differential Attacks Achieved In Mode 1

(4a. 2) Improvement in Resistance to Linear Attacks Achieved in Mode 1

(4b) Mode 1

(4b. 1) Improvement in Resistance to Differential Attacks Achieved in Mode 2

(4b. 2) Improvement in Resistance to Linear Attacks Achieved in Mode 2

[1. Differential Cryptanalysis of Common Key Block Encryption Algorithm]

First, a review is given on a differential cryptanalysis of a common key block encryption algorithm typified by the DES (Data Encryption Standard) algorithm, for a case in which a generalized common key block encryption model is used.

The common key block cipher algorithm includes two main parts: a round function part which transforms input data; and a key schedule part which produces keys used in respective rounds of the round function part. Keys (sub-keys) applied to the respective rounds of she round function part are produced by the key schedule part on the basis of a single master key, and used in the respective rounds. A typical common key encryption scheme is that according to the DES (Data Encryption Standard) adopted as one of Federal Information Processing Standards.

A typical common key block cipher structure, called a Feistel structure, is described with reference to FIG. 1.

In the Feistel structure, plaintext is transformed into ciphertext by simply iterating a transformation function. Herein, it is assumed that the plaintext has a length of 2mn bits, where m and n are integers. First, the plaintext with the length of 2mn bits is divided into two parts each having a length of mn bits, $P_L$ (Plain-Left) data 101 and $P_R$ (Plain-Right) data 102, which are input to the transformation function.

The Feistel structure is expressed by a series of rounds of a basic function called a round function. The data transformation function in each round is called an F-function 120, FIG. 1 shows an example of a Feistel structure in which an F-function (round function) 120 is applied repeatedly r times.

In a first round, for example, input data X with a length of inn bits and a round key $K_1$ 103 supplied from a key generator (not shown) are input to the F-function 120. The F-function 120 transforms the input data and outputs resultant data Y with a length of mn bits. The output data Y is input to an exclusive OR element 104 and is subjected to an exclusive OR operation with input data provided from the other side of a previous round (in the case of the first round, $P_L$ is given as the input data). Data with a length of mn bits obtained as a result of the operation is output to a next round function. If the above-described process including a predetermined number (r) of repetitions of the F-function, the encryption process is completed. Resultant cipher text including $C_L$ (Cipher-Right) data and $C_P$ (Cipher-Right) data is output. Note that the above-described structure allows it to decrypt the ciphertext simply by applying round keys in a reverse order using the same F-function, and thus an additional inverse function is not necessary.

Figure 2:
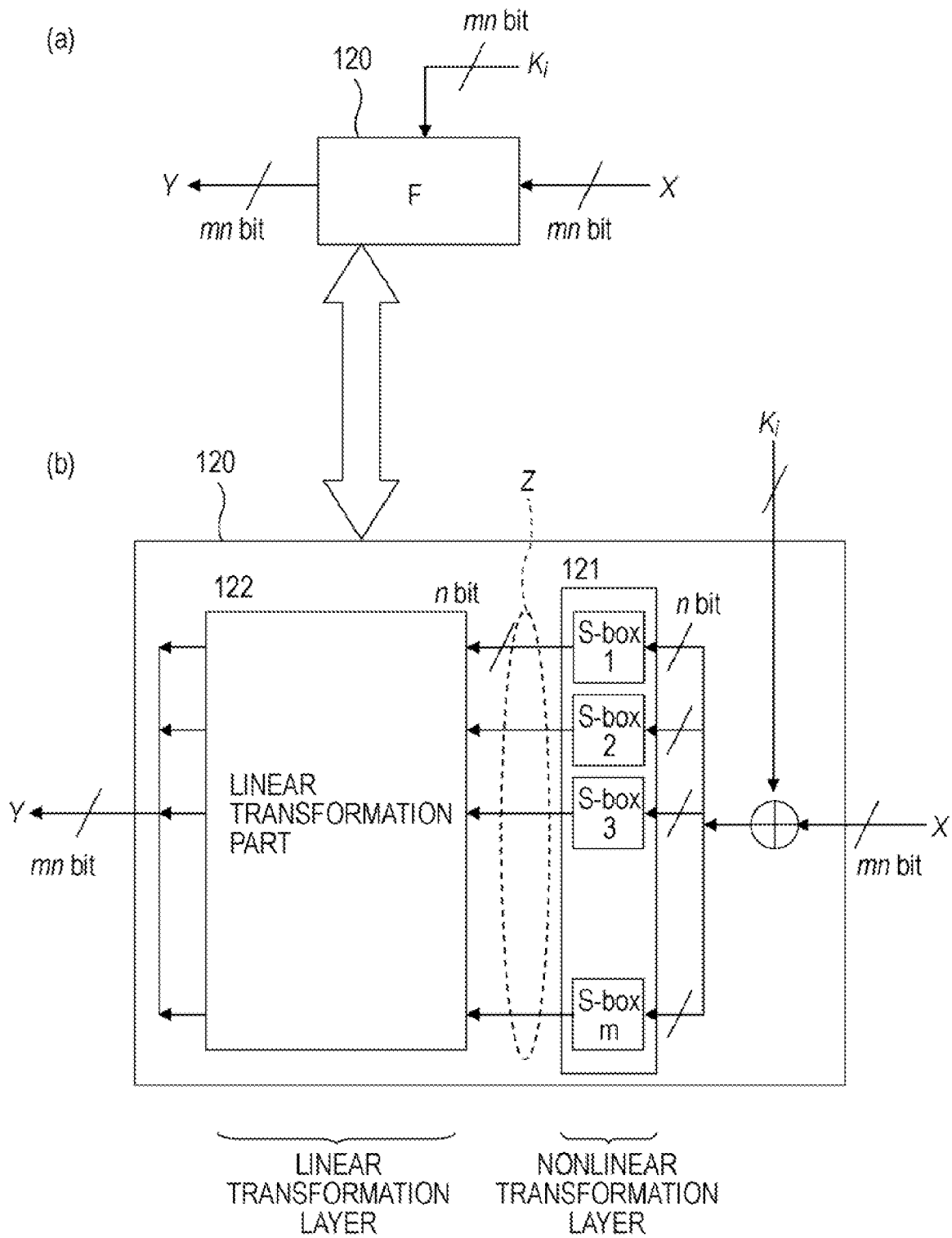
FIG. 2 is a diagram illustrating an F-function used as a round function.

With reference to FIG. 2, a structure of the F-function 120 used in each round is described below. FIG. 2(a) illustrates data input to and output from the F-function 120 in a single round. FIG. 2(b) illustrates the details of the structure of the F-function 120. In the structure shown in FIG. 2(b), the F-function 120 has a so-called SPN structure including a cascade of a nonlinear transformation layer and a linear transformation layer.

As shown in FIG. 2(b), the SPN-type F-function 120 has a plurality of S-boxes 121 for performing a nonlinear transformation process. An input value X with a length of ran bits provided from a previous round of the round function is subjected to an exclusive OR operation with a round key $K_i$ supplied from the key schedule part, and a resultant output is input to the plurality (m) of S-boxes 121 each of which performs a nonlinear transformation process on each n bits of the input. Each S-box performs the nonlinear transformation process, for example, using a transformation table.

An mn-bit output value Z given as output data from the S-boxes 121 is input to a linear transformation part 122 configured to perform the linear transformation process. The linear transformation part 122 performs the linear transformation process, for example, by exchanging bit positions, on the input mn-bit value Z. The result is output as an mn-bit value Y. The output value Y is then subjected to an exclusive OR operation with input data given by a previous round, and the result is applied as an input value to the F-function in a next round.

In the example of the F-function 120 shown in FIG. 2, the input/output length is m×n bits (ret and n are integers), the nonlinear transformation layer includes a parallel array of m S-boxes 121 each having an n-bit input and output, and the linear transformation part 122 functioning as the linear transformation layer performs the linear transformation process in accordance with an m×m square matrix whose elements are on an extension field of degree 2, GF ($2^n$), defined by an irreducible polynomial of degree n.

Figure 3:
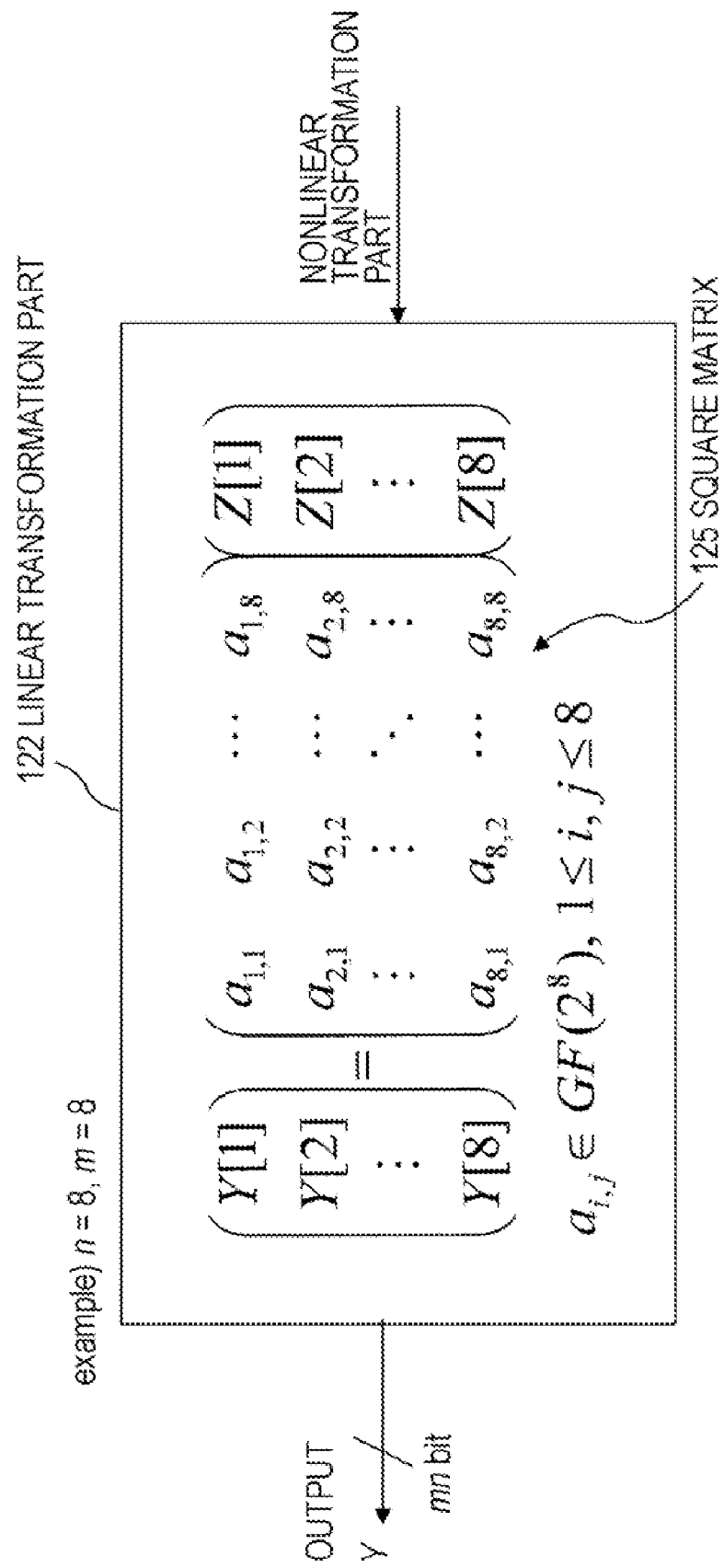
FIG. 3 is a diagram illustrating an example of a square matrix applied to a linear transformation process performed by a linear transformation part.

FIG. 3 shows an example or a square matrix used in the linear transformation process performed by the linear transformation part 122. In the example of the square matrix 125 shown in FIG. 3, n=8 and m=8. In FIG. 3, m n-bit data Z[1], Z[2], ..., Z[m] output from the nonlinear transformation part (the S-box 121) are subjected to the linear transformation in accordance with the predetermined square matrix 125. As a result, Y[1], Y[2], ..., Y[m] are determined and output from the F-function (round function). In this process, the linear operation on the elements of each data by the matrix is performed on the predetermined extension field of degree 2, GF($2^n$).

In Feistel ciphers according to conventional techniques, the same linear transformation layer is used as an F-function for all rounds. This can cause a plurality of differences to be cancelled out during propagation of differences. As described in the Background Art section, in a typical attacking method or a cryptanalysis method, a great number of input data (plaintext) having particular differences and corresponding output data (ciphertext) are analyzed to find keys used in respective round functions (this method is known as a differential cryptanalysis or a differential attack). In conventional common key block encryption algorithms such as the DES algorithm, a process (transformation matrix) performed by a linear transformation part 122 of an F-function part 120 is the same for all rounds. This makes it possible to easily analyze the algorithm and thus easily find keys.

An example of cancellation of a plurality of differences during propagation of differences is described below with reference to FIG. 4, Note that in the present description, a difference of a variable is denoted by putting a symbol Δ (delta) in front of the variable.

Figure 4:
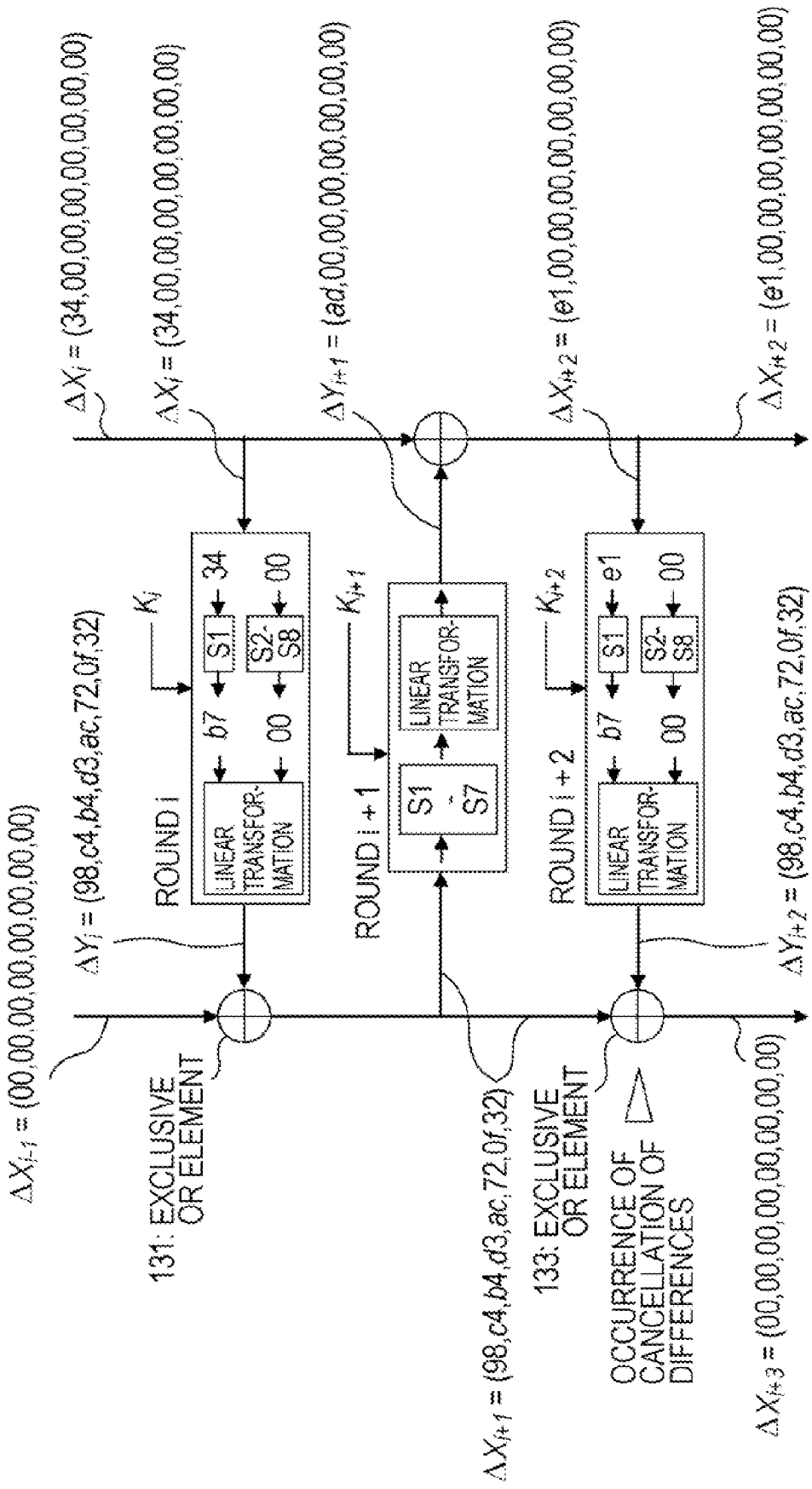
FIG. 4 is a diagram illustrating cancellation of differences through three rounds in a 128-bit block cipher with m=8 and n=8.

In the example shown in FIG. 4, cancellation of differences occurs for a 128-bit block cipher with m=8 and n=8 via three rounds. In FIG. 4, 64-bit data is divided into a plurality of parts each having a length of one byte, and is expressed in the form of a vector whose elements are expressed in hexadecimal.

Cancellation of differences via three rounds of the F-function can occur, for example, via transitions of data states 1 to 4, as described below. Kobe that such data states discussed herein can occur in the course of differential cryptanalysis in which a large number of differential input data are tested to find keys (round keys).

(State 1)
Elements of the left-hand part of the input difference ($\Delta X_{i-1}$=(00, 00, 00, 00, 00, 00, 00, 00)) applied to an i-th round are all zero, and elements of the right-hand part of the input difference ($\Delta X_i$=(34, 00, 00, 00, 00, 00, 00, 00)) are zero except for only one element input to an S-box. Note that this data state in the i-th round can occur in the course of cryptanalysis in which a large number of differential input data are tested.

The eight elements of $\Delta X_i$=(34, 00, 00, 00, 00, 00, 00, 00)) are input to respective m (m=8) S-boxes of the F-function. More specifically, the difference (34) is input to the first S-box (S1 in FIG. 4), and (00)'s are input to the second to eighth S boxes.

When (00) is input to any S-box, the output from this S-box is always (00). Thus, as long as difference data is concerned, any S-box which receives (00) as an input difference does not make any contribution to the operation. Thus, the S-box in such a state is said to be inactive, and such an S-box is called an inactive S-box. In contrast, an S-box which receives a non-zero input difference (34 in the example shown in FIG. 4) produces an output difference corresponding to the non-zero input difference as a result of the nonlinear transformation. Thus, such an S-box is called an active S-box.

In the example shown in FIG. 4, one active S-box (S1) produces an output difference (b7) in response to a non-zero input difference (34), and the other inactive S-boxes S2 to S8 produce an output difference (00) in response to an zero input difference (00). These output differences are input to the linear transformation part.

(State 2)
Output differences produced, in the i-th round by S-boxes (active S-boxes) which receive non-zero input differences (34 in the example shown in FIG. 4) are diffused by the nonlinear transformation layer and output (as an output value of $\Delta Y_i$ from the F-function. This output value is directly transferred as an input difference $\Delta X_{i+1}$ to the next round.

Figure 5:
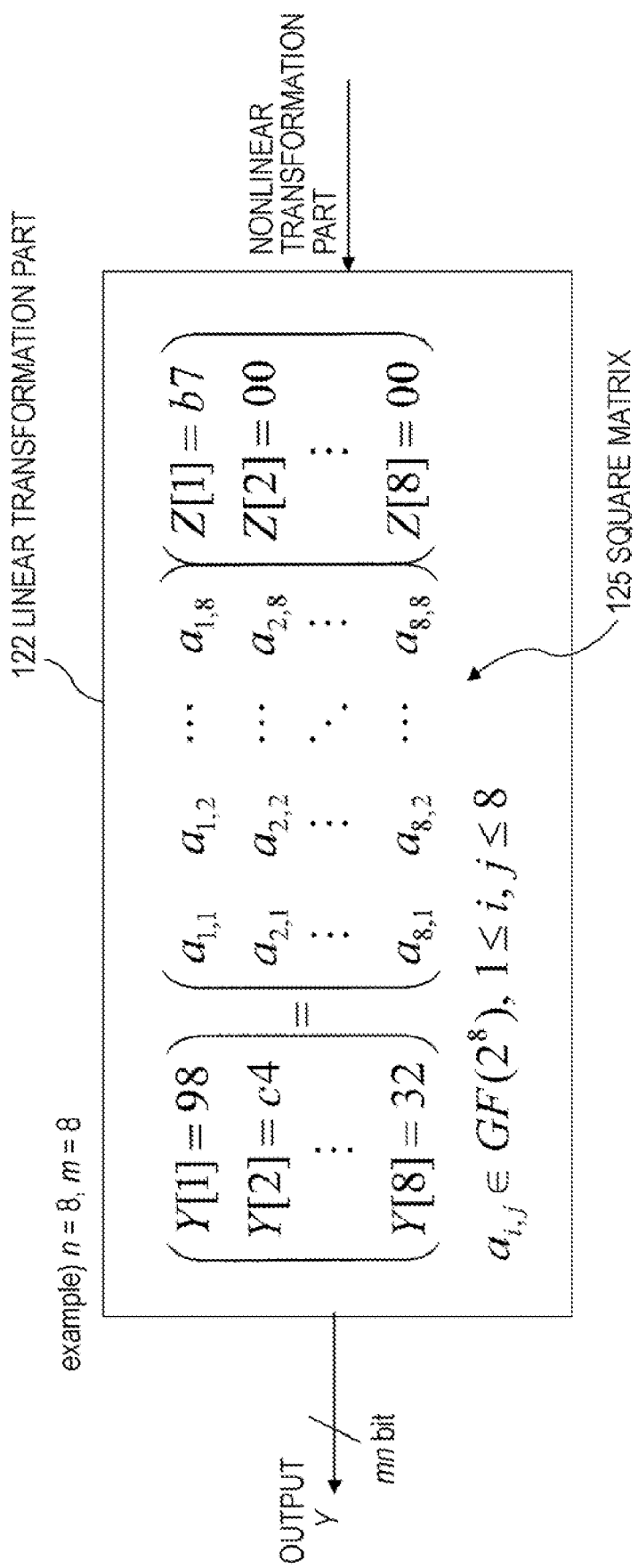
FIG. 5 is a diagram illustrating a specific example of producing an output difference $\Delta Y_i$ via a linear transformation performed by a linear transformation part of an F-function.

In the example shown in FIG. 4, a linear transformation is performed using a particular square matrix 123 such as that shown in FIG. 5, which is used in the F-function in common for all rounds, and $\Delta Y_i$=(98, c4, b4, d3, ac, 72, 0f, 32) is output as an output difference from the F-function in the i-th round. As can be seen from FIG. 5 illustrating the linear transformation, the determined output difference $\Delta Y_i$=(98, c4, b4, d3, ac, 72, 0f, 32) has a value dependent only on the output element Z[1]=b7 given from one active S-box (S1).

$\Delta Y_i$=(98, c4, b4, d3, ac, 72, 0f, 32) output as the output difference from the F-function in the i-th round is supplied to an exclusive OR (XOR) element 131 shown in FIG. 4 and is subjected to an exclusive OR (XOR) operation with the input difference $\Delta X_{i-1}$=(00, 00, 00, 00, 00, 00, 00, 00) whose elements are all equal to zero. An operation result is supplied as an input difference $\Delta X_{i+1}$ to a next round ((i+1)th round).

The exclusive OR (XOR) between the output difference $\Delta Y_i$=(98, c4, b4, d3, ac, 72, 0f, 32) output from the F-function in the i-th round and the input difference $\Delta X_{i-1}$=(00, 00, 00, 00, 00, 00, 00, 00) whose elements are all zero is equal to $\Delta Y_i$, and thus $\Delta X_{i+1}=\Delta Y_i$=(98, c4, b4, d3, ac, 72, 0f, 32) is supplied, as the input difference to the next round ((i+1)th round).

(State 3)
The output difference $\Delta Y_{i+1}$ given from the F-function in the (i+1)th round has a non-zero element only at a position corresponding to an S-box which was active in the i-th round. Note that this data state can occur in the course of cryptanalysis in which a large number of differential input data are tested.

More specifically, $\Delta Y_{i+1}=(ad, 00, 00, 00, 00, 00, 00, 00)$ is obtained as the output difference, which has, as in the i-th round, a non-zero value at a position corresponding to an S-box (the first S-box (S1) in the example shown in FIG. 4) to which a non-zero difference value (34, in the example shown in FIG. 4) is applied. Note that ad≠00.

(State 4)

An output difference provided by the active S-box (S1) in the (i+2)th round can be equal to the output difference provided by the active S-box (S1) in the i-th round. In the example shown in FIG. 4, b7 is output as the output difference by the active S-box (S1) in the (i+2)th round, and this is equal to the output difference (b7) output by the active S-box (S1) in the i-th round. Note that this data state can occur in the course of cryptanalysis in which a large number of differential input data are tested.

In such a data state, the output difference $\Delta Y_{i+2}=(98, c4, b4, d3, ac, 72, 0f, 32)$ output from the F-function in the (i+2)th round is equal to the output difference $\Delta Y_i=(98, c4, b4, d3, ac, 72, 0f, 32)$ output from the F-function in the i-th round which is two rounds before the (i+2)th round.

As a result, the exclusive OR element 133 calculates the XOR between two equal values, that is, $$\Delta X_{i+1}=\Delta Y_i=(98,c4,b4,d3,ac,72,0f,32) \text{ and}$$

$$\Delta Y_{i+2}=(93,c4,b4,d3,ac,72,0f,32).$$

As a result, a value whose elements are all equal to 0 is output by the exclusive OR element 133.

Thus, $\Delta X_{i+3}=(00, 00, 00, 00, 00, 00, 00, 00)$ is provided as an input difference to a next round ((i+3)th round) from the left-hand side of the previous round ((i+2)th round).

Elements of this left-hand side input $\Delta X_{i+3}=(00, 00, 00, 00, 00, 00, 00, 00)$ input to the (i+3)th round, are all equal to zero as with the left-hand side input $\Delta X_{i-1}=(00, 00, 00, 00, 00, 00, 00, 00)$ input to the i-th round. This implies that, there is a possibility that the process will be performed in rounds following the (i+3)th round in a similar manner to the i-th to (i+2)th rounds.

A problem resulting from the above is that the number of active S-boxes does not increase with the number of rounds, and thus the robustness against a difference attack does not increase.

One known measure indicating the robustness of common key block ciphers against the difference attack is the minimum number of active S-boxes as counted over all rounds of an encryption function. The greater the minimum number of active S-boxes, the greater the robustness against the difference attack.

As described above, in the differential cryptanalysis (differential attack), the correspondence between the input data (plaintext) and the output data (ciphertext) is analysed for a large number of input data with certain differences, and, on the basis of the correspondence, keys applied to the respective rounds are analysed. In the differential cryptanalysis, the smaller the number of active S-boxes, the easier the analysis and thus the simpler the required analysis process.

In the example described above with reference to FIG. 4, only the first S-box (S1) is active. Depending on setting of input data applied in the differential cryptanalysis, only one of the other S-boxes (S2 to S8) can be active. By performing the differential cryptanalysis in such a manner, it is possible to analyze the nonlinear transformation process performed by each S-box, and thus it is possible to analyze the round keys input to the F-function.

To increase the resistance to the differential analysis, it is necessary to maintain a sufficiently large number of active S-boxes, that is, it is required that the minimum number of active S-box be large enough.

In the example shown in FIG. 4, in the i-th round and (i+2)th round in which inputs are applied so the F-function from right to left, there are a total of only two active S-boxes. Although there are eight active S-boxes in the (i+1) round in which the input is applied to the F-function from left to right, the occurrence of cancellation of differences causes the number of active S-boxes to decrease to 0 in an (i+3)th round. This makes it easy to analyze, in the differential cryptanalysis, the nonlinear transformation process performed by each S-box.

In the common key block encryption algorithm shown in FIG. 4, the same linear transformation matrix is used in the linear transformation for all rounds. This creates a possibility that cancellation of differences occurs via only two active S-boxes in the F-function to which inputs are given from right to left. As a result, the minimum number of active S-boxes does not increase with the number of rounds, and thus the resistance to a differential attack does not increase.

Figure 6:
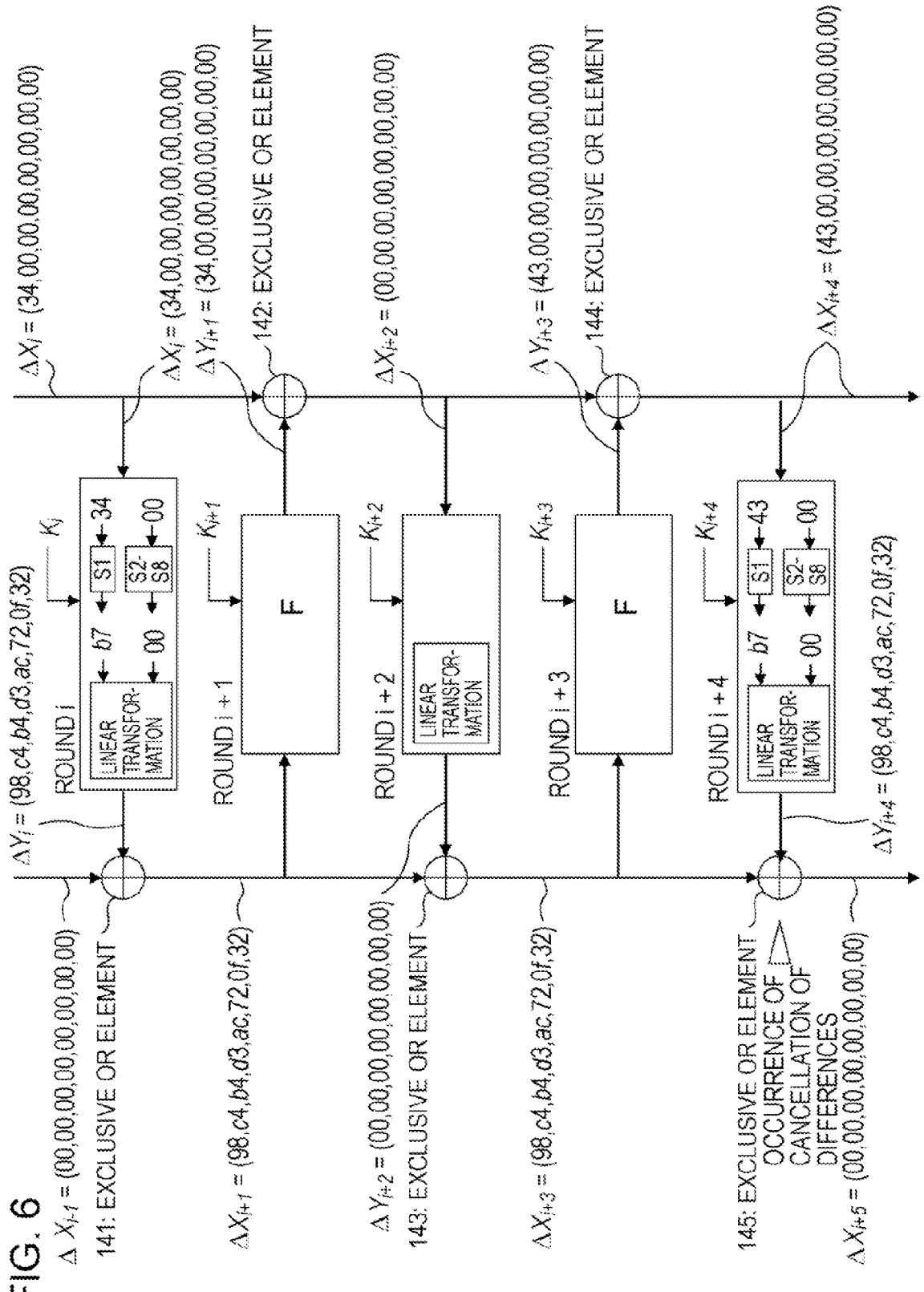
FIG. 6 is a diagram illustrating cancellation of differences through five rounds in a 128-bit block cipher with m=8 and n=8.

How, referring to FIG. 6, there is described an example of an occurrence of cancellation of differences via an operation of five rounds (rounds) in which the same linear transformation matrix used by the F-function.

In the example shown in FIG. 6, cancellation of differences occurs for a 128-bit block cipher with m=8 and n=8 via five rounds. In FIG. 8, 64-bit data is divided into a plurality of parts each having a length of one byte, and is expressed in the form of a vector whose elements are expressed in hexadecimal.

Cancellation of differences via five rounds of the F-function can occur, for example, via transitions of data states 1 to 7, as described below. Note that such data states discussed herein can occur in the course of differential cryptanalysis in which a large number of differential input data are tested to find keys (round keys).

(State 1)

Elements of the left-hand part of the input difference $(\Delta X_{i-1}=(00, 00, 00, 00, 00, 00, 00, 00))$ applied to an i-th round are all zero, and elements of the right-hand part of the input difference $(\Delta X_i=(34, 00, 00, 00, 00, 00, 00, 00))$ are zero except for only one element input to an S-box. Note that this data state in the i-th round can occur in the course of cryptanalysis in which a large number of differential input data are tested.

The eight elements of $\Delta X_1=(34, 00, 00, 00, 00, 00, 00, 00)$ are input to respective m (m=8) S-boxes of the F-function. More specifically, the difference (34) is input to the first S-box (S1 in FIG. 6), and (00)'s are input to the second to eighth S boxes.

As described above, when (00) is input to any S-box, the output from this S-box is always (00). Thus, as long as difference data is concerned, any S-box which receives (00) as an input difference does not make any contribution to the operation. Thus, the S-box in such a state is said to be inactive, and such an S-box is called an inactive S-box. In contrast, an S-box (S1) which receives a non-sere input difference (34 in the example shown in FIG. 45 produces an output difference corresponding to the non-zero input difference as a result of the nonlinear transformation. Thus, only this S-box (S1) is active.

In the example shown in FIG. 6, one active S-box (S1) produces an output difference (b7) in response to a non-zero input difference (34), and the other inactive S-boxes 32 to S8 produce an output difference (00) in response to an zero input difference (00). These output differences are input to the linear transformation part.

(State 2)

Output differences produced in the i-th round by S-boxes (active S-boxes) which receive non-zero input differences (34 in the example shown in FIG. 4) are diffused by the nonlinear transformation layer and output (as an output value of $\Delta Y_i$ from the F-function. This output value is directly transferred as an input difference $\Delta X_{i+1}$ to the next round.

In the example shown in FIG. 6, a linear transformation is performed using a particular square matrix 125 such as that shown in FIG. 5, which is used in common for all rounds, and $\Delta Y_i$=(98, c4, b4, d3, ac, 72, 0f, 32) is output as an output difference from the F-function in the i-th round.

The exclusive OR (XOR) between the output difference $\Delta Y_i$=(98, c4, b4, d3, ac, 72, 0f, 32) output from the F-function in the i-th round is supplied to an exclusive OH (XOR) element 141 shown in FIG. 6 and is subjected, to an exclusive OR (XOR) operation with the input difference $\Delta X_{i-1}$=(00, 00, 00, 00, 00, 00, 00, 00) whose elements are all equal to zero. An operation result is supplied as an input difference $\Delta X_{i+1}$ to a next round (i+1).

The exclusive OR (XOR) between the output difference $\Delta Y_i$=(98, c4, b4, d3, ac, 72, 0f, 32) output from the F-function in the i-th round and the input difference $\Delta X_{i-1}$=(00, 00, 00, 00, 00, 00, 00, 00) whose elements are all zero is equal to $\Delta Y_i$, and thus $\Delta X_{i+1}$=$\Delta Y_i$=(98, c4, b4, d3, ac, 72, 0f, 32) is supplied as the input difference to the next round ((i+1)th round).

(State 3)

The output difference $\Delta Y_{i+1}$ output from the F-function in the (i+1)th round has a non-zero element only at a position corresponding to an S-box which was active in the i-th round. Rote that this data state can occur in the course of cryptanalysis in which a large number of differential input data are tested.

More specifically, $\Delta Y_{i+1}$=(34, 00, 00, 00, 00, 00, 00, 00) is obtained as the output difference, which has, as in the i-th round, a non-zero value at a position corresponding to an S-box (the first S-box (S1) in the example shown in FIG. 4) to which a non-zero difference value (34, in the example shown in FIG. 6) is applied.

(State 4)

The exclusive OR between $\Delta X_i$=(34, 00, 00, 00, 00, 00, 00, 00) and $\Delta Y_{i+1}$=(34, 00, 00, 00, 00, 00, 00, 00) is determined by the exclusive OR element 142, and the result is input to the (i+2)th round of the F-function. In this case, the exclusive OR operation is performed on two equal data, and thus all elements of the result are equal to 0. Thus, $\Delta X_{i+2}$=(00, 00, 00, 00, 00, 00, 00, 00) is input to the (i+2)th round. As a result, all elements of an output difference provided by the (i+2)th round F-function are equal to zero. Thus, $\Delta Y_{i+2}$=(00, 00, 00, 00, 00, 00, 00, 00) is output in the (i+2)th round.

(State 5)

The exclusive OR between $\Delta X_{i+1}$=(98, c4, b4, d3, ac, 72, 0f, 32) and $\Delta Y_{i+2}$=(00, 00, 00, 00, 00, 00, 00, 00) whose elements are all equal to zero output as the output difference from the (i+2)th round F-function is determined by the exclusive OR element 143, and the result is input to the (i+3)th round F-function. Thus, $\Delta X_{i+3}$=$\Delta X_{i+1}$=(98, c4, b4, d3, ac, 72, 0f, 32) is input to the (i+3)th round of the F-function.

(State 6)

$\Delta Y_{i+3}$=(43, 00, 00, 00, 00, 00, 00, 00) is output as an output difference from the (i+3)th round of the F-function, and this output difference is subjected to the exclusive OR operation with $\Delta X_{i+2}$=(00, 00, 00, 00, 00, 00, 00, 00) whose elements are all equal to zero performed by the exclusive OR element 144. $\Delta X_{i+4}$=$\Delta Y_{i+3}$=(43, 00, 00, 00, 00, 00, 00, 00) is obtained as the result of the exclusive OR operation and is input as an input difference to an (i+4)th round of the F-function.

(State 7)

An output difference provided by the active S-box (S1) in the (i+4)th round can be equal to the output difference provided by the active S-box (s1) in the i-th round. In the example shown in FIG. 6, b7 is output as the output difference by the active S-box (S1) in the (i+4)th round, and this is equal to the output difference (b7) output by the active S-box (S1) in the i-th round. Note that this data state can occur in the course of cryptanalysis in which a large number of differential input data are tested.

In such a data state, the output difference $\Delta Y_{i+4}$=(98, c4, b4, d3, ac, 72, 0f, 32) output from the F-function in the (i+4)th round is equal to the output difference $\Delta X_{i+3}$=(98, c4, b4, d3, ac, 72, 0f, 32) output from the exclusive OR element 143 in the (i+2)th round which two rounds before the (i+4)th round.

As a result, the exclusive OR element 145 calculates the exclusive OR between two equal values, that is, $\Delta X_{i+3}$=(98,c4,b4,d3,ac,72,0f,32) and $\Delta Y_{i+4}$=(98,c4,b4,d3,ac,72,0f,32).

As a result, a value whose elements are all equal to 0 is output by the XOR element 145.

Thus, $\Delta X_{i+5}$=(00, 00, 00, 00, 00, 00, 00, 00) is input as an input difference to the next ((i+5)th) round.

Elements of this left-hand side input $\Delta X_{i+5}$=(00, 00, 00, 00, 00, 00, 00, 00) input to the (i+5)th round are all equal to zero as with the left-hand side input $\Delta X_{i-1}$=(00, 00, 00, 00, 00, 00, 00, 00) supplied, to the i-th round. This implies that there is a possibility that the process will be performed in rounds following the (i+5)th round in a similar manner to the i-th to (i+4)th rounds.

A problem resulting from the above is that the number of active S-boxes does not increase with the number of rounds, and thus the resistance to a differential attack does not increase.

As described above, in the differential cryptanalysis (differential attack), the correspondence between the input data (plaintext) and the output data (ciphertext) is analysed for a large number of input data with certain differences, and, on the basis of the correspondence, keys applied to the respective rounds are analyzed. In the differential analysis, the smaller the number of active S-boxes, the easier the analysis and thus the simpler the required analysis process.

In the example described above with reference to FIG. 6, in the i-th, (i+2)th, and (i+4)th rounds in which inputs are applied to the F-function from right to left, there is one active S-box in the i-th round, no active S-box in the (i+2)th round, and one active S-box in the (i+4)th round. Thus, there are a total of only two active S-boxes in these rounds. Although there are eight active S-boxes in the (i+1) round and also in the (i+3)th round, in which the input is applied to the F-function from left to right, the occurrence of cancellation of differences causes the number of active S-boxes to decrease to 0 in an (i+5)th round. This makes it easy to analyse, in the differential analysis, the nonlinear transformation process performed by each S-box, and thus it becomes possible to easily analyze the round keys input to the F-function.

In the example described above with reference to FIG. 6, only the first S-box (S1) is active. Depending on setting of input data applied in the differential analysis, only one of the other S-boxes (S2 to S8) can be active. By performing the differential analysis in such a manner, it is possible to analyse the nonlinear transformation process performed by each S-box, and thus it is possible to analyse the round keys input to the F-function.

Figure 7:
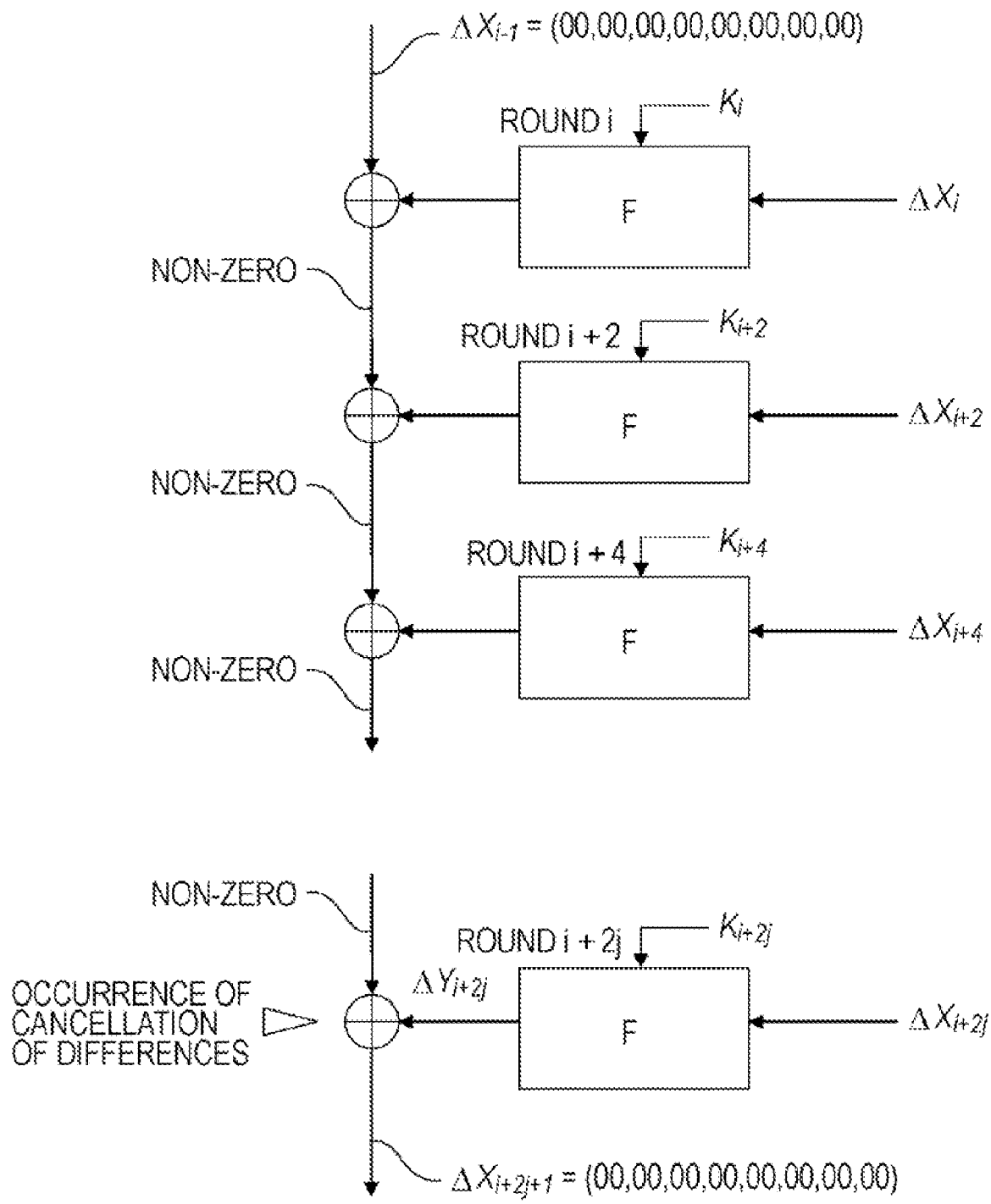
FIG. 7 is a diagram illustrating a definition of cancellation of differences through an arbitrary number of rounds in a common key block cipher.

Examples of occurrences of cancellation of differences have been described above for the case where cancellation occurs via three rounds and in the case where cancellation occurs via five round, with reference to FIGS. 4 and 6. The above-described discussion can be expanded to a general case in which cancellation occurs through an arbitrary number of rounds. With reference to FIG. 7, cancellation of differences through an arbitrary number of rounds is defined. Note that, of all rounds included in the Feistel structure for common key block encryption, only every other round (i, i+2, i+4, ..., i+2i) is shown in FIG. 7.

DEFINITION

In the Feistel structure, when a half ($P_L$ or $P_R$) of an input difference equal to 0 is input to the i-th round, bin the example shown in FIG. 7, $\Delta X_i$=(00, 00, 00, 00, 00, 00, 00, 00)), if the exclusive OR between an output difference given from an (i+2j)th (j=0, 1, 2, ...) round of the F-function and an input difference given from a previous round becomes equal to 0 at a certain round (i+2k) (in the example shown in FIG. 7, $\Delta X_{1+2j+1}$=(00, 00, 00, 00, 00, 00, 00, 00)), then it is said that cancellation through a plurality of rounds has occurred.

When such cancellation occurs, active S-boxes in the i-th, (i+2)th, (i+4)th, (i+2k)th rounds of the F-function are called "active S-boxes which have made a contribution to the cancellation". If the number of non-zero elements of a vector A is defined as a humming weight hw(A), then the number, a, of active S-boxes which have made the contribution to the cancellation can be given by the following formula.

$$a = \sum_{j=0}^{k} hw(\Delta X_{i+2j})$$

In the above-described examples in which cancellation occurs through three or five rounds, the number of active S-boxes contributing to the cancellation through the plurality of rounds is equal to 2, that is, a 2.

As described above, one of measures indicating the robustness of common key block ciphers against the difference attack is the minimum number of active S-boxes as counted over all rounds of an encryption function. The greater the minimum number of active S-boxes, the greater the robustness against the difference attack.

However, in a case of a structure in which the same linear transformation matrix is used for all rounds of an F-function as with the DES algorithm, as described above with reference to FIGS. 4 and 6, only two active S-boxes can cause an occurrence of cancellation through a plurality of rounds. This property creates the problem that the minimum number of active S-boxes does not increase with the number of rounds, and thus the resistance to the differential attack does not increase.

[2. Linear Analysis of Common Key Block Encryption Algorithm]

In the differential analysis, as described above, an operator of analysis prepares a plurality of input data (plaintext) having particular differences and analyzes output data (ciphertext) corresponding to the respective input data. In contrast, in linear analysis, it is not necessary to prepare a plurality of input data (plaintext) having particular differences, but analysis is performed on the basis of output data (ciphertext) corresponding to a particular number of input data (plaintext) or more.

In the common key block encryption algorithm, as described above, S-boxes serving as nonlinear transformation parts are used, and there is no linear relationship between input data (plaintext) and output data (ciphertext). In the linear analysis, the correspondence between the input and the output of S-boxes is approximated with a linear expression, and the approximated linear relationship between bit values of input data (plaintext) and corresponding output data (ciphertext) is analysed for a large number of data. On the basis of the analysis result, candidates for keys are narrowed down. In the linear analysis, input data do not necessarily need to have particular differences, and it is possible to easily perform analysis simply on the basis of a large number of plaintext and corresponding ciphertext.

3. Examples of Encryption Algorithm with Improved Resistance to cryptanalysis

Next, there is described an encryption algorithm according to an invention previously filed by the present applicant as Patent Application No. 2003-339634 or Patent Application No. 2004-256465. The encryption algorithm provides better robustness against attacks based on linear analysis or differential analysis. That is, ciphers according to these encryption algorithms are difficult to analyze and thus have improved security.

One of features of the encryption algorithm is that, unlike the conventional DES algorithm, a process (according to a transformation matrix) performed by a linear transformation part of an F-function is not the same for all rounds, but the process is performed differently using a plurality of different square MDS (Maximum Distance Separable) matrices. More specifically, the linear transformation is performed according to square MDS matrices which are different at least between immediately adjacent even rounds and also between immediately adjacent odd rounds.

In this encryption algorithm, a property of square MDS (Maximum Distance Separable) matrices is used to realize a structure which perfectly or nearly perfectly prevents cancellation of differences from occurring through a plurality of rounds via a small number of active S-boxes. This structure of the common key block encryption algorithm allows an increase in the minimum number of active S-boxes and thus provides high resistance to differential attacks. This encryption algorithm also has high resistance to linear cryptanalysis performed on the basis of known plaintext.

This encryption algorithm based on a widely used common block cipher structure called the Feistel structure including an SPN-type F-function described above with reference to FIGS. 1 and 2. That is, in this structure, plaintext is converted into ciphertext, or ciphertext is converted into plaintext simply by repeating the SPN-type F-function including a nonlinear transformation part and a linear transformation part over a plurality of rounds.

For example, when plaintext with a length of 2 mn bits (where m and n are integers) is given, the given 2mn-bit plaintext, is divided into two mn-bit parts, a PL (Plain-Left) part and a PR (Plain-Right) part. These two parts are given as input values to the F-function, and the F-function is executed in each of a plurality of rounds. As described above with reference to FIG. 2, the F-function has an SPN form including a cascade of two parts, a nonlinear transformation part including S-boxes, and a linear transformation part.

In this encryption algorithm, the linear transformation part of the F-function is performed in accordance with a linear transformation matrix which is selected, in each round, from a plurality of different square MDS (Maximum Distance Separable) matrices. More specifically, the selection is made so that selected square MDS matrices are different at least between adjacent even rounds and also between adjacent odd rounds.

Square MDS matrices are described in further detail below. When a given matrix satisfies following both conditions (a) and (b), the matrix is said to be a square MDS matrix.

(a) The matrix is in the form of a square matrix.

(b) The determinant of any submatrix included in the matrix is not equal to 0, that is, det(submatrix)≠0.

Matrices satisfying the above conditions (a) and (b) are referred to as square MDS matrices.

FIG. 8 illustrates an example of a square MDS matrix for use in a common key block encryption process in which data input/output to/from an F-function in each round has a length of m×n bits (where m and n are integers), a nonlinear transformation part of the F-function includes m S-boxes each having an input/output size of n bits, and a linear transformation part of the F-function performs a linear transformation process according to a square matrix with an order of m whose elements are on an extension field of degree 2, GF($2^n$), defined by an irreducible polynomial of degree n. In this example of the square MDS matrix shown in FIG. 8, n=8 and m=8.

In a square MDS matrix satisfying the conditions (a) and (b) described above, if the number of non-zero elements of a vector A is expressed by a humming weight hw(A), the square MDS matrix with an order m is denoted by M, and an input vector to the square MDS matrix M is denoted, by x, then the following inequality (formula 1) is satisfied.

$$hw(x)+hw(Mx) \geq m+1 \quad \text{(formula 1)}$$

Formula 1 implies that the sum of the number, hw(x), of non-zero elements of input data x to be subjected to the linear trans format ion according to the square MDS matrix (M) and the number, hw(Mx), of non-zero elements of output data Mx produced as a result of the linear transformation according to the square MDS matrix (M) is equal to or greater than the order, m, of the square MDS matrix.

Note that the name "square MDS matrix" comes from the fact that a generator matrix of MDS-code (Maximum Distance Separable Code) in a standard form satisfies the above-described condition.

It is known that even in the conventional structure in which the same linear transformation matrix is used in all rounds of execution of an F-function, use of a square MDS matrix as the linear transformation matrix makes it possible to increase the minimum number of active S-boxes compared with the case in which a non-MDS matrix is used.

In the present algorithm, a matrix satisfying a requirement needed for a square MDS matrix is used in each round of the F-function, while a different matrix is selected each time a round is performed. More specifically, the selection is made so that selected square MDS matrices are different at least between adjacent even rounds and also between adjacent odd rounds.

Now, there are described below some examples of 2r-round (r is an integer) Feistel common key block cipher structures that provide improved resistance to differential attacks.

In the following explanation, a notation MLTj is used to denote a linear transformation matrix applied to a j-th round of F-function in a 2r-round. Feistel common key block cipher structure.

In the present algorithm associated with the 2r-round Feistel common key block cipher structure, the linear transformation part of the F-function is performed in accordance with a linear transformation matrix which is selected, in each round, from a plurality of different square MDS (Maximum Distance Separable) matrices. More specifically, the selection is made so that selected square MDS matrices are different at least between adjacent even rounds and also between adjacent odd rounds.

More specifically, q square MDS matrices L1, L2, . . . , Lq are produced for use in the 2r-round Feistel common key block encryption process (where q≦r), and one of these square MDS matrices is selected, in each round, as the linear transformation matrix used in the linear transformation part of the F-function such that q square MDS matrices L1, L2, . . . , Lq, L1, L2 . . . are applied in turn to respective odd rounds of the F-function from up to down, while q square MDS matrices L1, L2, . . . , Lq, L1, L2 . . . are applied in turn to respective even rounds from bottom to top.

Figure 9:
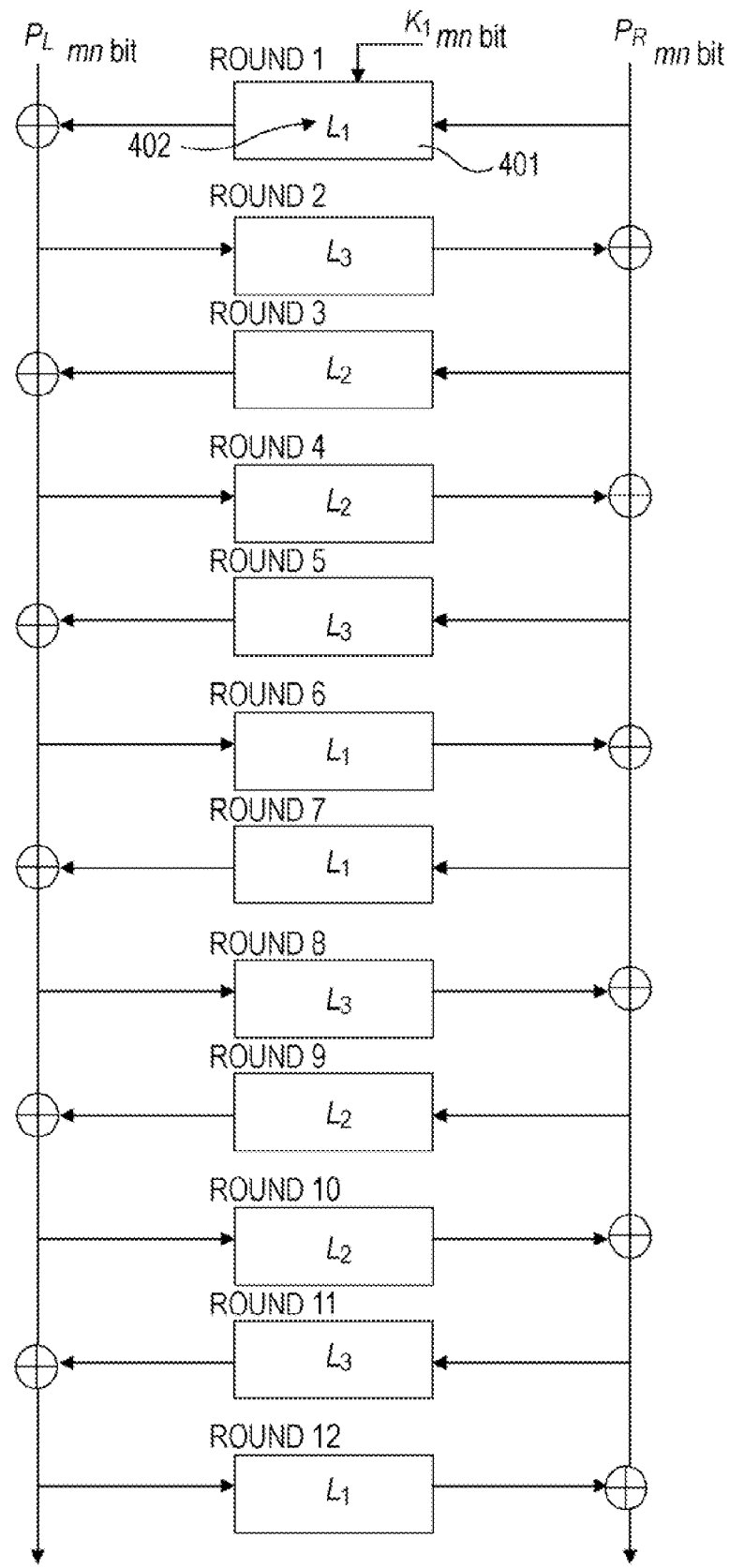
FIG. 9 is a diagram illustrating an example of setting square MDS matrices as linear transformation matrices applied to respective rounds of an F-function in a common key block encryption algorithm.

A specific example of this structure is shown in FIG. 9. In this example shown in FIG. 9, the Feistel common key block cipher structure has 12 rounds (that is, 2r=12 or r=6), and q is set to 3 so that three different square MDS matrices (L1, L2, and L3) are used, in turn in respective rounds by the linear transformation part of the F-function.

In the algorithm shown in FIG. 9, given 2mn-bit plaintext is divided into two mn-bit parts, a PL (Plain-Left) part and a PR (Plain-Right) part, which are given as input values to the F-function, and the F-function is executed in each of a plurality of rounds. The F-function 401 in the first round, and also in any other round, has an SPN form including a cascade of two parts, a nonlinear transformation part including S-boxes, and a linear transformation part, as described above with reference to FIG. 2.

Note that, in the structure shown in FIG. 9, r=6 and q=3, and a symbol "Ln" in each F-function box denotes a square MDS matrix 402. More specifically, three different square MDS matrices L1, L2, and L3 are used in turn in the linear transformation process performed by the linear transformation part of the F-function in respective rounds.

A process of setting linear transformation matrices MLTj is described below with reference to FIG. 10.

[Step S21]

A number q is set to be equal to or smaller than one-half, r, of the number, 2r, of rounds. That is, select a value of q satisfying the following condition:

$$q \geq r$$

where q is an integer equal to or greater than 2.

[Step S22]

As many as q square MDS matrices with an order m, L1, L2, . . . , Lq on GF($2^n$) are produced. The details of a method of producing g square MDS matrices with an order m L1, L2, . . . , Lq on GF($2^n$) will be described later.

After q square MDS matrices with the order m L1, L2, . . . Lq on GF ($2^n$) have been produced in step S22, square MDS matrices are set as described below.

[Step S23]

$L_{(i-1 \bmod q)}+1$ is set to a linear transformation matrix $\text{MLT}_{2i-1}$ for use in a (2i−1) th round (1≦i≦r).

[Step S24]

$\text{MLT}_{2r-2i+1}$ is set to a linear transformation matrix $\text{MLT}_{2i}$ for use in a 2i-th round (1≦i≦r).

In the example shown in FIG. 9 where there are twelve rounds (r=6) and q=3, matrices are set as follows.

MLT1=L1, MLT2=L3
MLT3=L2, MLT4=L2
MLT5=L3, MLT6=L1
MLT7=L1, MLT8=L3
MLT9=L2, MLT10=L2
MLT11=L3, MLT12=L1

As described above, in the cryptographic processing apparatus using the present algorithm, q square MDS matrices L1, L2, ... Lq are produced for use in the 2r-round Feistel common key block encryption process (where $q \leq r$). The produced q square MDS matrices L1, L2, ..., Lq, L1, L2 ... are applied in turn to respective odd rounds of the F-function from up to down, while q square MDS matrices L1, L2, ..., Lq, L1, L2 ... are applied in turn to respective even rounds from bottom to top.

The process of producing q square MDS matrices with order m, L1, L2 ..., Lq, on $GF(2^n)$ in step 322 in the flow shown in FIG. 10, and the process of assigning the produced matrices to the F-function are explained in further detail below, for the following three cases listed blow.

(3-a) Producing Square MDS Matrices and Applying Them to F-Function Such That high Resistance to Differential Attacks IS Achieved (3-b) Producing Square MDS Matrices and Applying Them to F-Function Such That High Resistance to Linear Attacks IS Achieved (3-c) Producing Square MDS Matrices and Applying Them to F-Function Such That High Resistance to Differential Attacks And Linear Attacks IS Achieved (3-a) Producing Square MDS Matrices and Applying Them to F-Function Such That High Resistance to Differential Attacks IS Achieved First, by way of example, three modes a1, a2, and a3 are described in which square MDS matrices are produced and assigned to the F-function so as to achieve high resistance to differential attacks.

(Mode a1)

Figure 11:
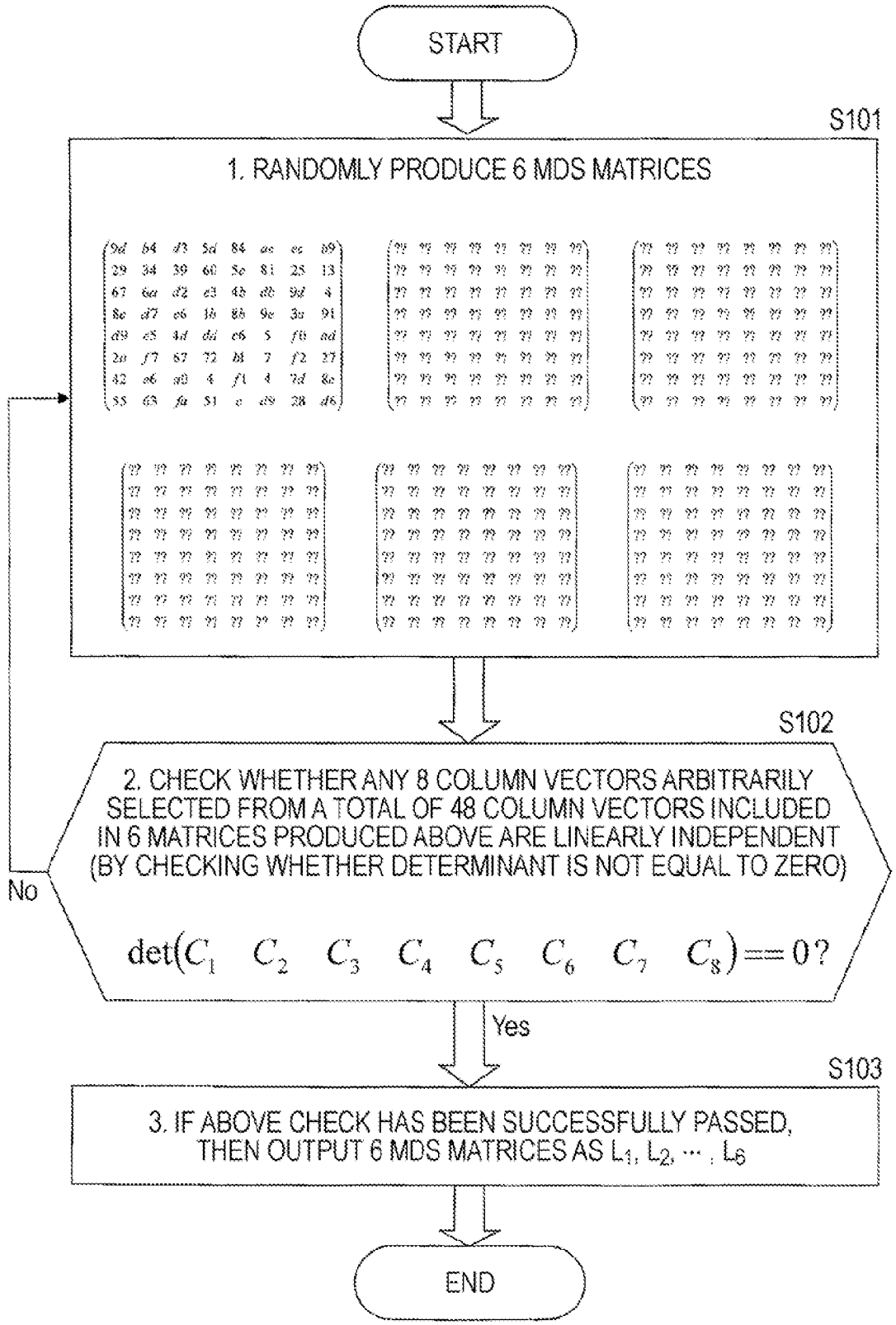
FIG. 11 is a flow chart illustrating a mode, a1, of a process of producing square MDS matrices used as linear transformation matrices applied to respective rounds of an F-function so that resistance to a differential attack is improved.

As a first example, a mode a1 is described. In this mode, square MDS matrices are produced and assigned to the F-function so as to achieve high resistance to differential attacks, as described below. First, referring to a flow chart shown in FIG. 11, a process of producing square MDS matrices is described.

[Step S101]

First, the number q of necessary square MDS matrices, the degree n of the extension field, and the size m of the matrices are input.

As many as g square MDS matrices with order m, L1, L2, ..., Lq on $GF(2^n)$ are randomly produced. Note that in the flow shown in FIG. 11, it is assumed that the number q of MDS matrices is set to 6, the degree n of the extension field is set to 3, and the size m of matrices is set to 8.

[Step S102]

A check is performed as to whether any m columns arbitrarily selected from a total of qm columns included in q square MDS matrices with an order m L1, L2, ..., Lq are linearly independent. If the above-described check has been successfully passed, the processing flow proceeds to step S103, but otherwise the processing flow returns to step S101.

[Step S103]

The resultant q square MDS matrices L1, L2, ..., Lq with order m are output for use as square MDS matrices applied to 2r-round Feistel common key block encryption.

As a result of the above-described process, q square MDS matrices with an order m L1, L2, ..., Lq are produced. Note that $q \leq r$.

Figure 10:
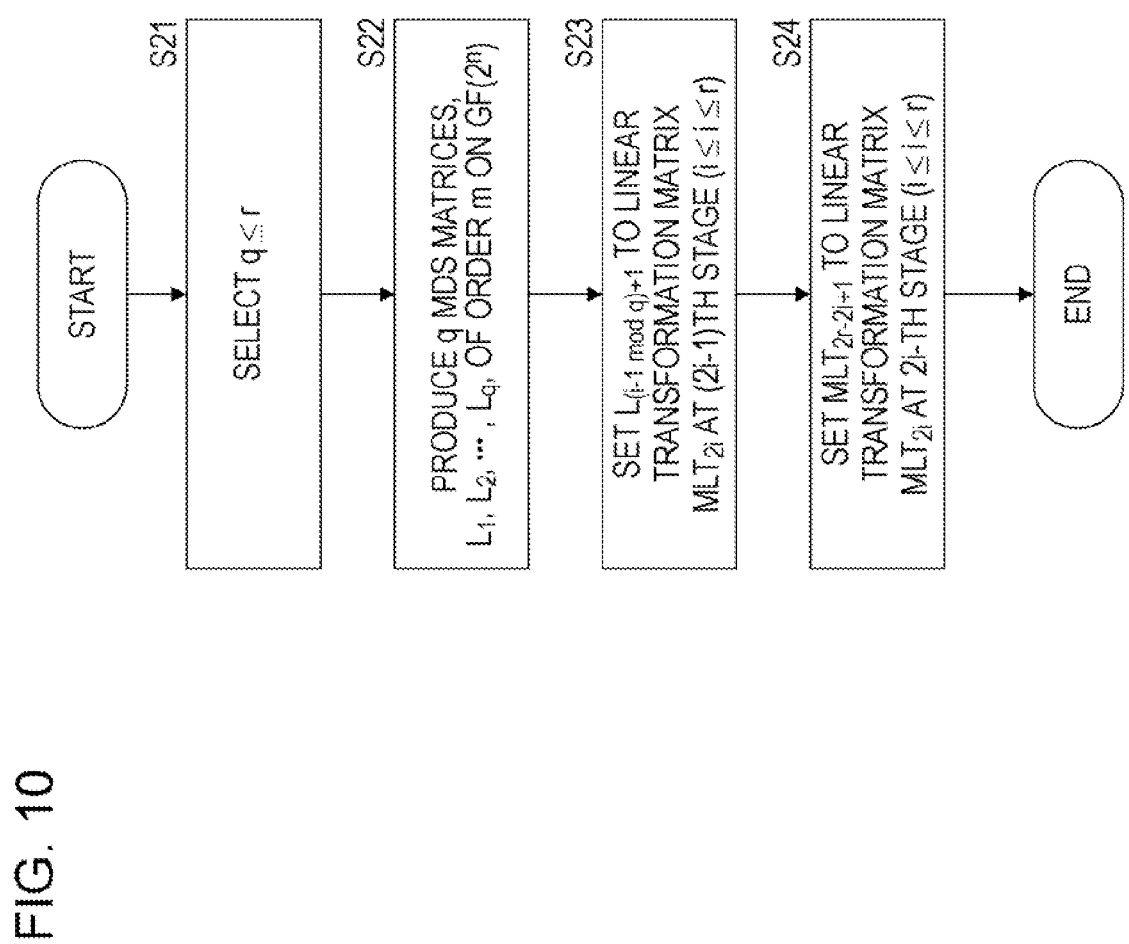
FIG. 10 is a flow chart illustrating a process of setting square MDS matrices as linear transformation matrices applied to respective rounds of an F-function in a common key block encryption algorithm.

The q square MDS matrices with the order m, L1, L2 ..., Lq, produced in the above-described manner are set as matrices applied to the linear transformation part of the F-function in respective rounds of the 2r-round Feistel common key block encryption process, in accordance with [Step S23] and [Step S24] described, above with reference to FIG. 10. More specifically, q square MDS matrices L1, L2, Lq, L1, L2 ... are applied in turn to respective odd rounds of the F-function from up to down, while q square MDS matrices L1, L2, ..., Lq, L1, L2 ... are applied in turn to respective even rounds from bottom to top.

By assigning square MDS matrices such that the order in which matrices are assigned to even rounds is opposite to the order in which matrices are assigned to odd rounds in the above-described manner, it is guaranteed that, encryption and decryption can be performed in a similar manner except that keys are applied in opposite orders.

In the present mode, it is guaranteed that the following conditions (a) to (c) are satisfied.

(a) The linear transformation matrix used, in each F-function should be a square MDS matrix.

(b) Any m column vectors arbitrarily selected, from any of linear transformation matrices used in at least q successive F-functions in odd rounds in an encryption function are independent.

(c) Any m column vectors arbitrarily selected from any of linear transformation matrices used in at least q successive F-functions in even rounds are independent.

Thus, it is guaranteed that, in a Feistel common key block cipher structure with a plurality of rounds according to the present mode, cancellation of differences does not occur as a result of operation by m pieces of or smaller number of active S-boxes through successive (2q−1) rounds. This results in an increase in the minimum number of active S-boxes, as counted over the whole rounds of the F-function.

As described above, in the present mode, it is possible to increase the minimum number of active S-boxes as counted over all rounds of the encryption function, which is one of measures indicating the robustness of common key block ciphers against differential attacks. As a result, it is possible to increase the active S-boxes subjected to differential cryptanalysis (differential attack), and thus it is possible to increase difficulty in cryptanalysis. Thus, the encryption algorithm according to the present mode has high security, and key cannot be easily found via cryptanalysis.

(Mode a2)

As a second example, a mode a2 is described below. Also in this mode, square MDS matrices are produced and assigned to the F-function so as to achieve high resistance to differential attacks. First, referring to a flow chart shown in FIG. 12, a process of producing square MDS matrices is described.

[Step S201]

First, the number, q, of necessary MDS matrices, the degree, n, of the extension field, and the size, art, of the matrices are input.

As many as q square MDS matrices with order m, L1, L2, ..., Lq on $GF(2^n)$ are randomly produced. Note that in the flow shown in FIG. 12, it is assumed that the number q of MDS matrices is set to 6, the degree n of the extension field is set to 8, and the size m of matrices is set to 8.

[Step S202]

A check is performed as to whether any m columns arbitrarily selected from a total of qm columns included in q square MDS matrices with an order m L1, L2, ..., Lq form a square MDS matrix. If the above-described check has been successfully passed, the processing flow proceeds to step S203, but otherwise the processing flow returns to step S201.

As described above, when a given matrix satisfies following both conditions (a) and (b), the matrix is said to be a square MDS matrix.

(a) The matrix is in the form of a square matrix.

(b) The determinant of any submatrix included in the matrix is not equal to 0, that is, det(submatrix)≠0.

[Step S203]

The resultant q square MDS matrices L1, L2, ..., Lq with order m are output for use as square MDS matrices applied to 2r-round Feistel common key block encryption.

As a result of the above-described process, q square MDS matrices with an order m. L1, L2, ..., Lq are produced. Note that q≦r.

In the process of producing square MDS matrices according to the Mode a1 described above, as described above with reference to FIG. 11, a check, is performed, in step S102 as to whether any m columns arbitrarily selected from a total of qm columns included in q square MDS matrices with order m, L1, L2 ..., Lq, are linearly independent. In contrast, in the process of producing square MDS matrices according to the present Mode a2, a check is performed as to whether any m columns arbitrarily selected from a total of qm columns included in q square MDS matrices with order m, L1, L2, ..., Lq, form a square MDS matrix. That is, in the present mode, the check is performed in a more strict manner.

Figure 12:
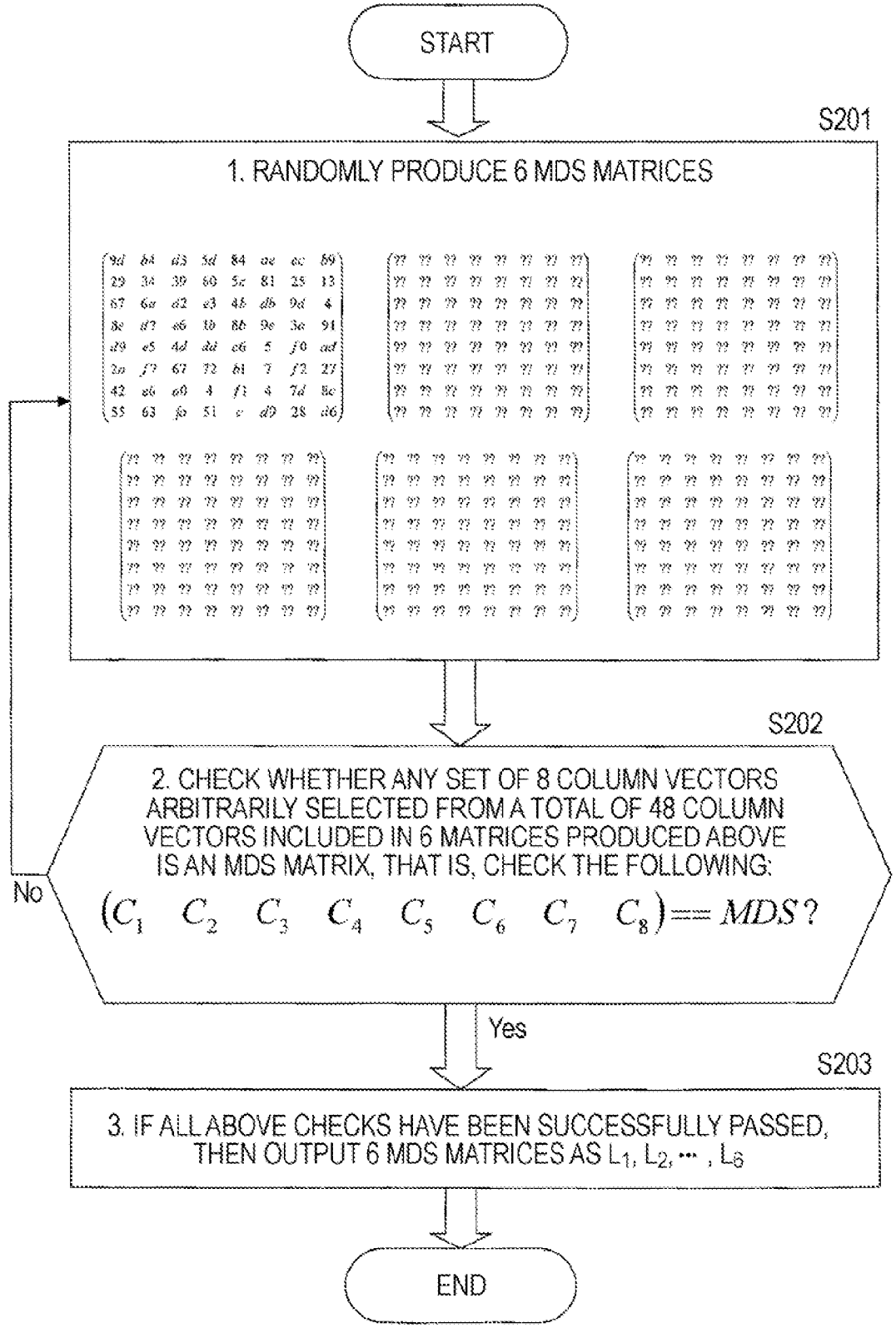
FIG. 12 is a flow chart illustrating a mode, a2, of a process of producing square MDS matrices used as linear transformation matrices applied to respective rounds of an F-function so that resistance to a differential attack is improved.

The q square matrices with the order m L1, L2, ..., Lq produced in the square MDS matrix producing process shown in FIG. 12 are set, as in the case of mode a1 described above, as matrices applied to the linear transformation part of the F-function in respective rounds of the 2r-round Feistel common key block encryption process, in accordance with [Step S23] and [Step S24] described above with reference to FIG. 10. More specifically, q square MDS matrices L1, L2, ..., Lq, L1, L2 ... are applied in turn to respective odd rounds of the F-function from up to down, while q square MDS matrices L1, L2, ..., Lq, L1, L2 ... are applied in turn to respective even rounds from bottom to top.

By assigning square MDS matrices such that the order in which matrices are assigned to even rounds is opposite to the order in which matrices are assigned to odd rounds in the above-described manner, it is guaranteed that encryption and decryption can be performed in a similar manner except that keys are applied in opposite orders.

In the present mode, it is guaranteed that the following conditions (a) to (c) are satisfied.

(a) The linear transformation matrix used in each F-function should be a square MDS matrix.

(b) Any m column vectors arbitrarily selected from any of linear transformation matrices used in at least q successive F-functions in odd rounds in an encryption function form a square MDS matrix.

(c) Any m column vectors arbitrarily selected from any of linear transformation matrices used in at least q successive F-functions in even rounds form a square MDS matrix.

Thus, it is guaranteed that, in a Feistel common key block cipher structure with a plurality of rounds according to the present mode, cancellation of differences does not occur as a result of operation by m pieces of or smaller number of active S-boxes through successive (2q−1) rounds.

In the present mode, it is further guaranteed that the following condition is also satisfied.

(d) By property of square MDS matrices, the number of non-zero elements in differential values obtained as a result of operation by a (a≦m) pieces of active S-boxes is equal to or greater than m+1−a. This results in an increase in the minimum number of active S-boxes, as counted over the whole rounds of the F-function.

As described above, in the present mode, it is possible to increase the minimum number of active S-boxes as counted over all rounds of the encryption function, which is one of measures indicating the robustness of common key block ciphers against differential attacks. As a result, it is possible to increase the active S-boxes subjected to differential cryptanalysis (differential attack), and thus it is possible to increase difficulty in cryptanalysis. Thus, the encryption algorithm according to the present mode has high security, and key cannot be easily found via cryptanalysis.

(Mode a3)

Figure 13:
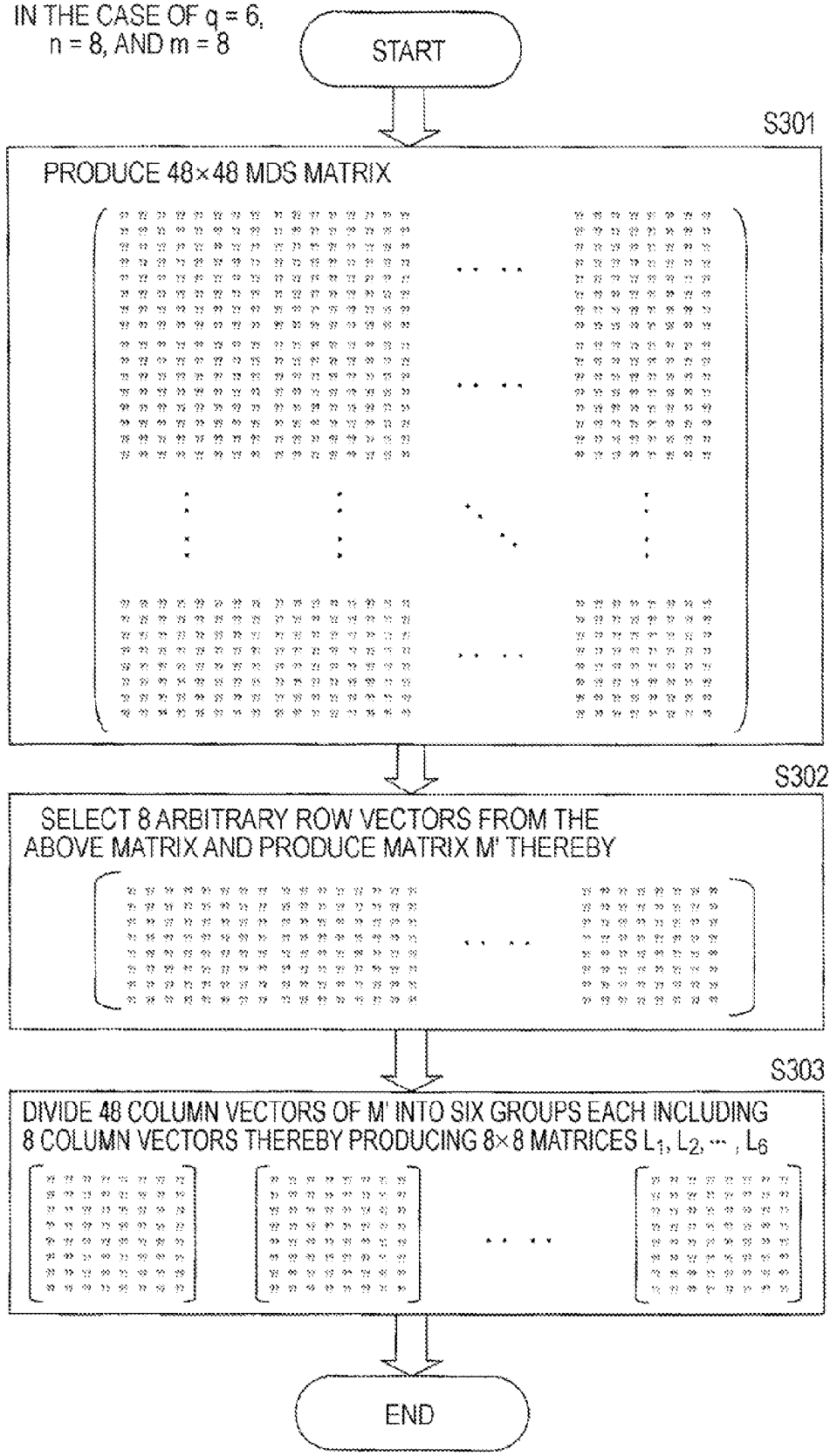
FIG. 13 is a flow chart illustrating a mode, a3, of a process of producing square MDS matrices used as linear transformation matrices applied to respective rounds of an F-function so that resistance to a differential attack is improved.

As a third example, a mode a3 is described below. Also in this mode, square MDS matrices are produced and assigned to the F-function so as to achieve high resistance to differential attacks. First, referring to a flow chart shown in FIG. 13, a process of producing square MDS matrices is described.

[Step S301]

First, the number, q, of necessary MDS matrices, the degree, n, of the extension field, and the size, m, of the matrices are input.

One square MDS matrix M with order qm on $GF(2^n)$ is produced. Note that in the flow shown in FIG. 13, it is assumed that the number q of MDS matrices is set to 6, the degree n of the extension field is set to 8, and the size m of matrices is set to 8.

[Step S302]

From the square MDS matrix M with order qm, m rows are arbitrary extracted, and an m×qm matrix M' is produced from the extracted rows.

[Step S303]

The m×qm matrix M' is arbitrarily divided into g groups each including m columns extracted, without creating an overlap, from a total of qm columns included in the m×qm matrix M', and square matrices L1, L2, ..., Lq are produced from column vectors of respective groups. The resultant square matrices L1, L2, ..., Lq are output as square MDS matrices for use in the 2r-round Feistel common key block encryption process.

As a result of the above-described process, q square MDS matrices with an order m $L_1, L_2, \ldots, L_q$ are produced. Note that q≦r.

The process of producing square MDS matrices according to the mode a3 is described in further detail below with reference to FIG. 14.

[Step S301]

Figure 14:
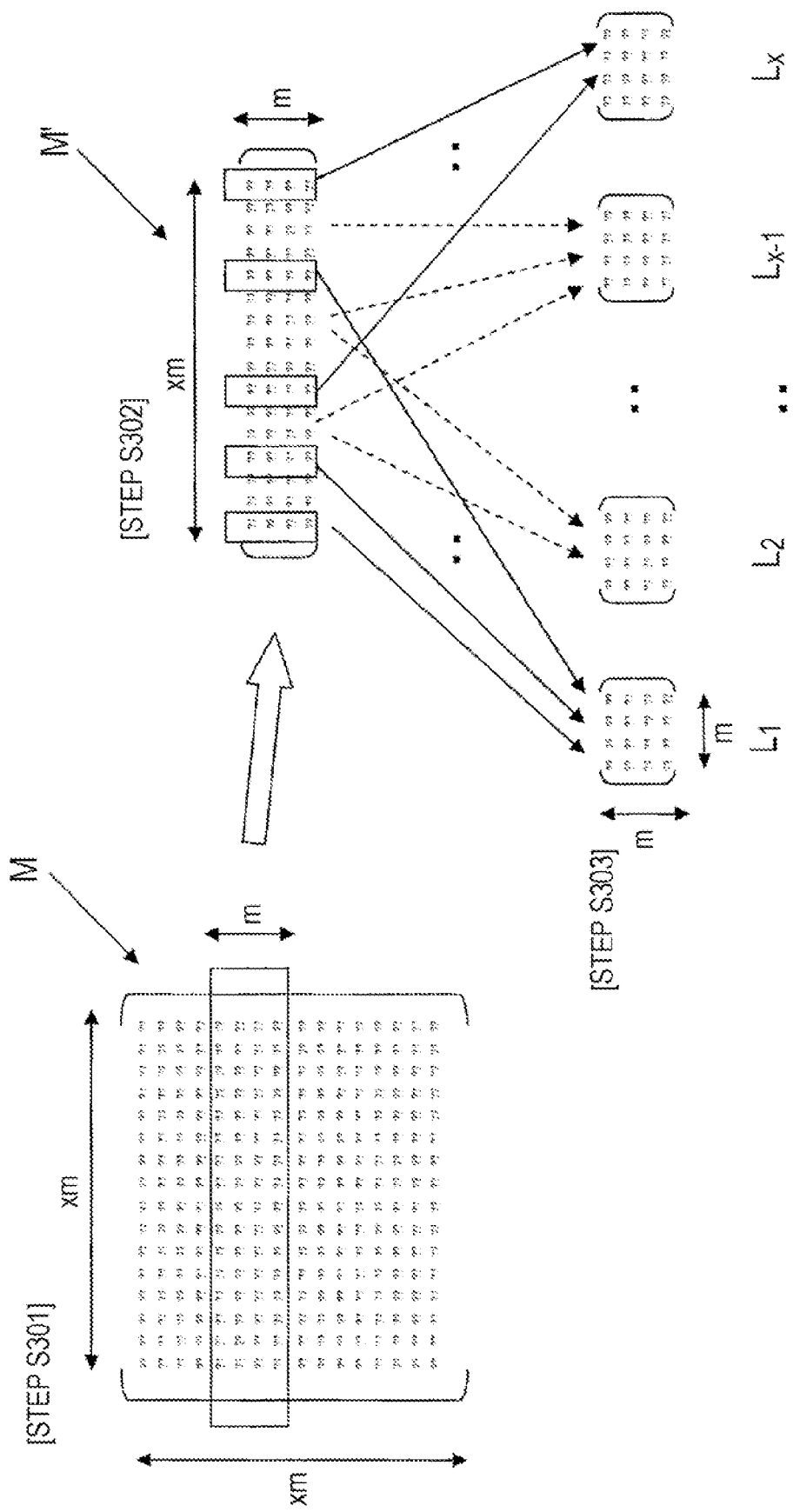
FIG. 14 is a diagram illustrating a specific example of the mode, a3, of producing square MDS matrices used as linear transformation matrices applied, to respective rounds of an F-function.

One square MDS matrix M with order qm on $GF(2^n)$ is produced as shown in FIG. 14. Note that the order of the matrix M produced in this step S301 may be greater than qm.

[Step S302]

As shown in FIG. 14, m rows are arbitrary extracted from the produced square MDS matrix M with order qm, and an m×qm matrix M' is produced from the extracted rows. Although in the example shown in FIG. 14, m successive rows are extracted to form the square m×qm matrix M', it is not necessary to extract successive rows, but arbitrary m rows may extracted.

[Step S303]

The m×qm matrix M' is arbitrarily divided into x groups each including m columns extracted, without creating an overlap, from a total of qm columns included in the m×qm matrix M', and square matrices L1, L2, ..., Lx are produced from column vectors of respective groups.

The q square MDS matrices with the order m, L1, L2, ..., Lq, produced in the square MDS matrix producing process described above with reference to FIGS. 13 and 14 are set, as in the case of mode a1 or a2 described above, as matrices applied to the linear transformation part of the F-function in respective rounds of the 2r-round Feistel common key block encryption process, in accordance with [Step S23] and [Step 324] described above with reference to FIG. 10. More specifically, q square MDS matrices L1, L2, ..., Lq, L1, L2, ..., are applied in turn to respective odd rounds of the F-function from up to down, while q square MDS matrices L1, L2, ..., Lq, L1, L2 ... are applied in turn to respective even rounds from bottom to top.

By assigning square MDS matrices such that the order in which matrices are assigned to even rounds is opposite to the order in which matrices are assigned to odd rounds in the above-described manner, it is guaranteed that encryption and decryption can be performed in a similar manner except that keys are applied in opposite orders.

In the present mode, it is guaranteed that, the following conditions (a) to Co) are satisfied.

(a) The linear transformation matrix used in each F-function should be a square MDS matrix.

(b) Any m column vectors arbitrarily selected from any of linear transformation matrices used in at least q successive F-functions in odd rounds in an encryption function are independent.

(c) Any m column vectors arbitrarily selected from any of linear transformation matrices used in at least q successive F-functions in even rounds are independent.

Thus, it is guaranteed that, in a Feistel common key block cipher structure with a plurality of rounds according to the present mode, cancellation of differences does not occur as a result of operation by m pieces of or smaller number of active S-boxes through successive (2q−1) rounds.

In the present mode, it is further guaranteed that the following condition is also satisfied.

(d) By property of square MDS matrices, the number of non-zero elements in differential values obtained as a result of operation by a (a≦m) pieces of active S-boxes is equal to or greater than m+1−a. This results in an increase in the minimum number of active S-boxes, as counted over the whole rounds of the F-function.

The mode a3 is advantageous, in particular, when m and r are so large that the mode a1 or a2 would need a long time to determine matrices, and matrices cannot be determined in a practically allowable short time. Even in such a situation, the mode a3 allows square MDS matrices to be produced in an allowable short time.

This is because, in the mode a3, it is possible to use a method such as a Reed-Solomon code generation method that can be executed in a practically allowable time even for large m or r.

In the present mode a3, as described above, it is possible to increase the minimum number of active S-boxes as counted over all rounds of the encryption function, which is one of measures indicating the robustness of common key block ciphers against differential attacks. As a result, it is possible to increase the active S-boxes subjected to differential cryptanalysis (differential attack), and thus it is possible to increase difficulty in cryptanalysis. Thus, the encryption algorithm according to the present mode has high security, and key cannot be easily found via cryptanalysis.

(3-b) Producing Square MDS Matrices and Applying Them to F-Function Such That High Resistance to Linear Attacks IS Achieved Next, by way of example, two modes b1 and b2 are described in which square MDS matrices are produced and assigned to the F-function so as to achieve high resistance to linear attacks.

(Mode b1)

As a first example, the mode b1 is described in which, square MDS matrices are produced and assigned to the F-function so as to achieve high resistance to linear attacks. First, referring to a flow chart shown in FIG. 15, a process of producing square MDS matrices is described.

[Step S401]

First, the number, q, of necessary square MDS matrices, the degree, n, of the extension field, and the size, m, of the matrices are input.

As many as q square MDS matrices with order m, M1, M2, ..., Mq on GF($2^n$) are randomly produced. Note that in the flow shown in FIG. 14, it is assumed that the number q of square MDS matrices is set to 6, the degree n of the extension field is set to 8, and the size m of matrices is set to 8.

[Step S402]

Figure 15:
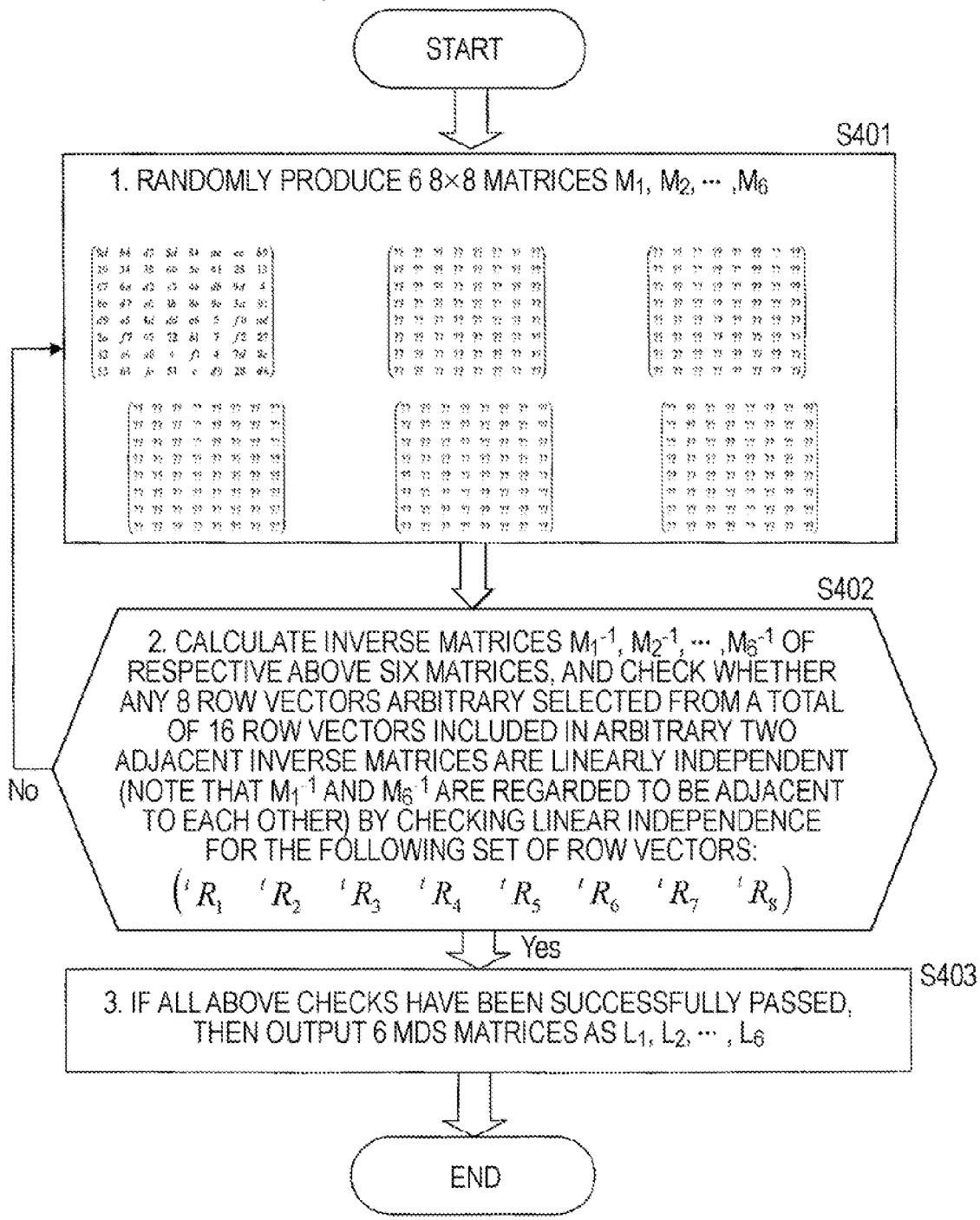
FIG. 15 is a flow chart illustrating a mode, b1, of a process of producing square MDS matrices used as linear transformation matrices applied to respective rounds of an F-function so that resistance to a linear attack is improved.

Inverse matrices $M1^{-1}$, $M2^{-1}$, ..., $Mq^{-1}$ of respective q square MDS matrices M1, M2, ..., Mq with an order m are calculated, and a check is performed as to whether any m row vectors arbitrarily selected from a total of 2m row vectors included in any two adjacent inverse matrices are linearly independent. In FIG. 15, ${}^tR$ denotes a transposed vector of a row vector. If the above-described check has been successfully passed, the processing flow proceeds to step S403, but otherwise the processing flow returns to step S401. Note that $M1^{-1}$ and $Mq^{-1}$ are regarded as being adjacent to each other.

[Step S403]

The resultant q square MDS matrices L1, L2, Lq with order m are output for use as square MDS matrices applied to 2r-round Feistel common key block encryption.

As a result of the above-described process, q square MDS matrices with an order m L1, L2, ..., Lq are produced. Note that q≦r.

The q square MDS matrices with the order m, L1, L2, ..., Lq, produced in the above-described manner are set as matrices applied to the linear transformation part of the F-function in respective rounds of the 2r-round Feistel common key block encryption process, in accordance with [Step S23] and [Step S24] described above with reference to FIG. 10. More specifically, q square MDS matrices L1, L2, ..., Lq, L1, L2 ... are applied in turn to respective odd rounds of the F-function from up to down, while q square MDS matrices L1, L2, ..., Lq, L1, L2 ... are applied in torn to respective even rounds from bottom to top.

By assigning square MDS matrices such that the order in which matrices are assigned to even rounds is opposite to the order in which matrices are assigned to odd rounds in the above-described manner, it is guaranteed that encryption and decryption can be performed in a similar manner except that keys are applied in opposite orders.

In the present mode, it is guaranteed that the following conditions (a) and (b) are satisfied.

(a) The linear transformation matrix used in each F-function should be a square MDS matrix.

(b) Any m column vectors arbitrarily included in an inverse matrix of any of linear transformation matrices included in successive odd rounds and even rounds of the encryption function are independent.

This makes it possible to increase the degree of difficulty in cryptanalysis using linear approximation in linear attacks, and thus it is possible to realise an encryption algorithm with high security, which makes it difficult to find keys via cryptanalysis.

(Mode b2)

As a second example, the mode b2 is described. Also in this mode, square MDS matrices are produced and assigned to the F-function, so as to achieve high resistance to linear attacks. First, referring to a flow chart shown in FIG. 16, a process of producing square MDS matrices is described.

[Step S501]

First, the number, q, of necessary square MDS matrices, the degree, n, of the extension field, and the size, m, of the matrices are input.

As many as q square MDS matrices with order m, M1, M2, ..., Mq on GF($2^n$) are randomly produced. Kobe that in the flow shown in FIG. 16, it is assumed that the number q of square MDS matrices is set to 6, the degree n of the extension field is set to 8, and the size m of matrices is set to 6.

[Step S502]

Figure 16:
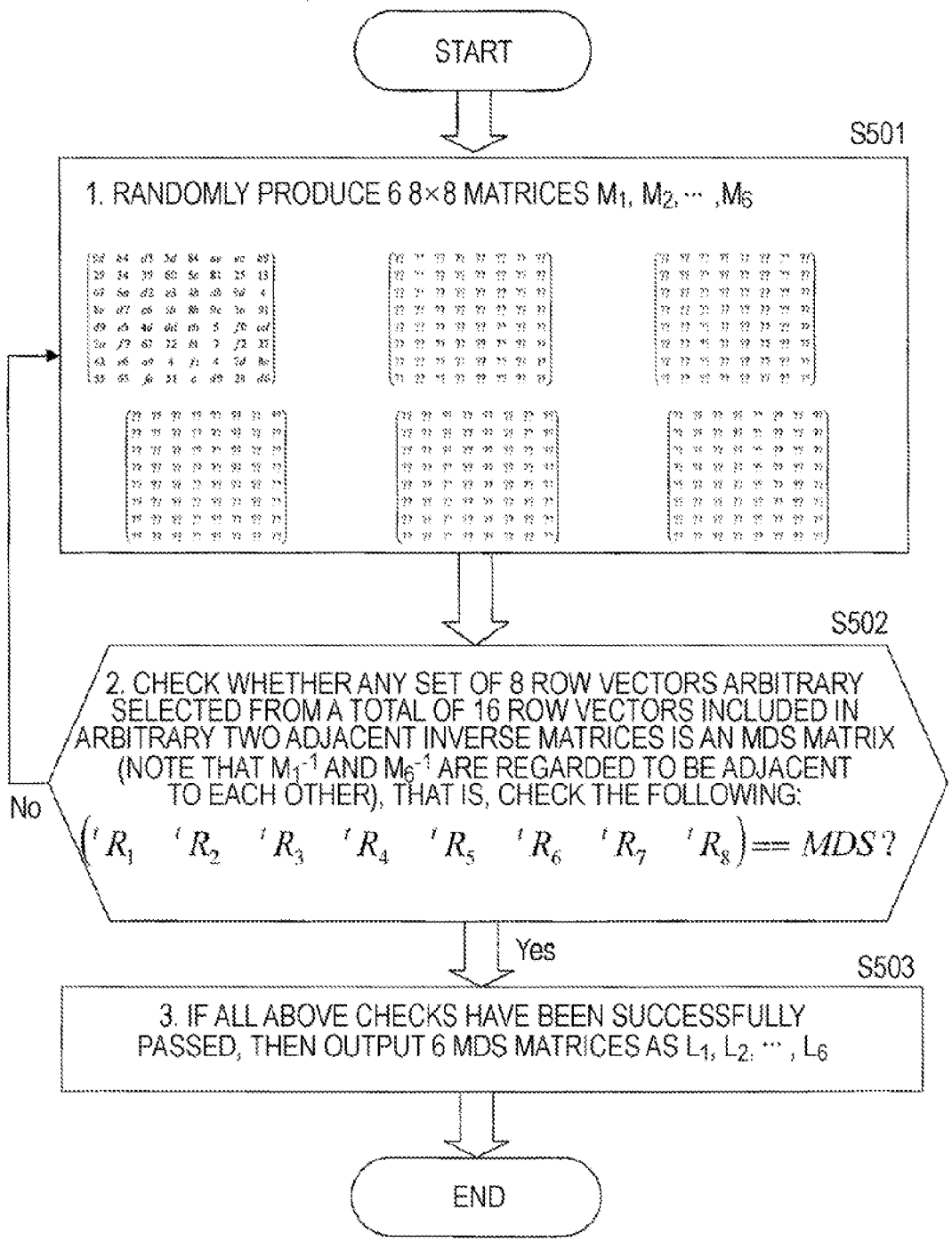
FIG. 16 is a flow chart illustrating a mode, b2, of a process of producing square MDS matrices used as linear transformation matrices applied to respective rounds of an F-function so that resistance to a linear attack is improved.

Inverse matrices $M1^{-1}, M2^{-1}, \ldots, Mq^{-1}$ of respective q square MDS matrices M1, M2, ..., Mq with an order m are calculated, and a check is performed as to whether any m row vectors arbitrarily selected from a total of 2m row vectors included in any two adjacent inverse matrices form a square MDS matrix. In FIG. 16, $^tR$ denotes a transposed vector of a row vector. If the above-described check has been successfully passed, the processing flow proceeds to step S503, but otherwise the processing flow returns to step S401, Note that $M1^{-1}$ and $Mq^{-1}$ are regarded as being adjacent to each other.

As described above, when a given matrix satisfies following both conditions (a) and (b), the matrix is said to be a square MDS matrix.

(a) The matrix is in the form of a square matrix.

(b) The determinant of any submatrix included in the matrix is not equal to 0, that is, det (submatrix)≠0.

[Step S503]

The resultant q square MDS matrices L1, L2, ..., Lq with order m are output for use as square MDS matrices applied to 2r-round Feistel common key block encryption.

As a result of the above-described process, q square MDS matrices with an order m $L_1, L_2, \ldots, L_q$ are produced. Note that q≦r.

In the process of producing square MDS matrices according to the Mode b1 described above, as described above with reference to FIG. 15, a check, is performed, in step S402 as to whether any m columns arbitrarily selected from a total of qm columns included in inverse matrices $M1^{-1}, M2^{-1}, \ldots, Mq^{-1}$ of q square MDS matrices with order m, M1, M2, ..., Mq, are linearly independent. In contrast, in the present mode b2, a check is performed as to whether any m columns arbitrarily selected from a total of qm columns included in inverse matrices $M1^{-1}, M2^{-1}, \ldots, Mq^{-1}$ of q square MDS matrices with order m, M1, M2, ..., Mq form a square MDS matrix. That is, in the present mode, the check is performed in a more strict manner.

The q square matrices with the order m L1, L2, ..., Lq produced in the square MDS matrix producing process shown in FIG. 16 are set, as in the case of mode b1 described above, as matrices applied to the linear transformation part of the F-function in respective rounds of the 2r-round Feistel common key block encryption process, in accordance with [Step 323] and [Step 324] described above with reference to FIG. 10. More specifically, q square MDS matrices L1, L2, ..., Lq, L1, L2 ... are applied, in turn to respective odd rounds of the F-function from up to down, while q square MDS matrices L1, L2, ..., Lq, L1, L2 ... are applied in turn to respective even rounds from bottom to top.

By assigning square MDS matrices such that the order in which matrices are assigned to even rounds is opposite to the order in which matrices are assigned to odd rounds in the above-described manner, it is guaranteed that encryption and decryption can be performed in a similar manner except that keys are applied in opposite orders.

In the present mode, it is guaranteed that the following conditions (a) and (b) are satisfied.

(a) The linear transformation matrix used in each F function should be a square MDS matrix.

(b) Any m column vectors arbitrarily included in an inverse matrix of any of linear transformation matrices included in successive odd rounds and even rounds of the encryption function form a square MDS matrix.

This makes it possible to increase the degree of difficulty in cryptanalysis using linear approximation in linear attacks, and thus it is possible to realise an encryption algorithm with high security, which makes it difficult to find keys via cryptanalysis.

[(3-c) Producing Square MDS Matrices and Applying Them to F-Function Such That High Resistance to Differential Attacks And Linear Attacks IS Achieved]

An example of a mode is described below in which square MDS matrices are produced and assigned to the F-function so as to achieve high resistance to differential attacks and linear attacks.

In encryption algorithms, high resistance to differential attacks can foe achieved by producing square MDS matrices used in the linear transformation process performed by the linear transformation part of the F-function in one of three modes a1 (FIG. 11) to a3 (FIG. 13) in the manner described above with reference to FIGS. 10 to 13. In encryption algorithms, high resistance to linear attacks can be achieved by producing square MDS matrices used in the linear transformation process performed by the linear transformation part of the F-function in one of two modes b1 (FIG. 14) and b2 (FIG. 15) in the manner described above with reference to FIG. 10 and FIGS. 14 and 15.

High resistance to both differential attack and linear attack can be achieved by producing square MDS matrices according to a combination of one of modes a1 (FIG. 11) to a3 (FIG. 13) and one of modes b1 (FIG. 14) and b2 (FIG. 15), and by using the produced, square MDS matrices in the linear transformation process performed by the linear transformation part of the F-function in respective rounds of the 2r-round Feistel common key block encryption process, in accordance with [Step S23] and [Step S24] described above with reference to FIG. 10.

More specifically, q square MDS matrices are produced in one of combinations described below.

Combination of Mode a1 and Mode b1
Combination of Mode a1 and Mode b2
Combination of Mode a2 and Mode b1
Combination of Mode a2 and Mode b2
Combination of Mode a3 and Mode b1
Combination of Mode a3 and Mode b2

The resultant matrices are used in the linear transformation process performed by the linear transformation part of the F-function in respective rounds of the 2r-round Feistel common key block encryption process. More specifically, q square MDS matrices L1, L2, ..., Lq, L1, L2 ... are applied in turn to respective odd rounds of the F-function from up to down, while q square MDS matrices L1, L2, ..., Lq, L1, L2 ... are applied in turn to respective even rounds from bottom to top. The setting of square MDS matrices in the above-described manner makes it possible to realize an encryption process having high resistance to both differential attacks and linear attacks.

Figure 17:
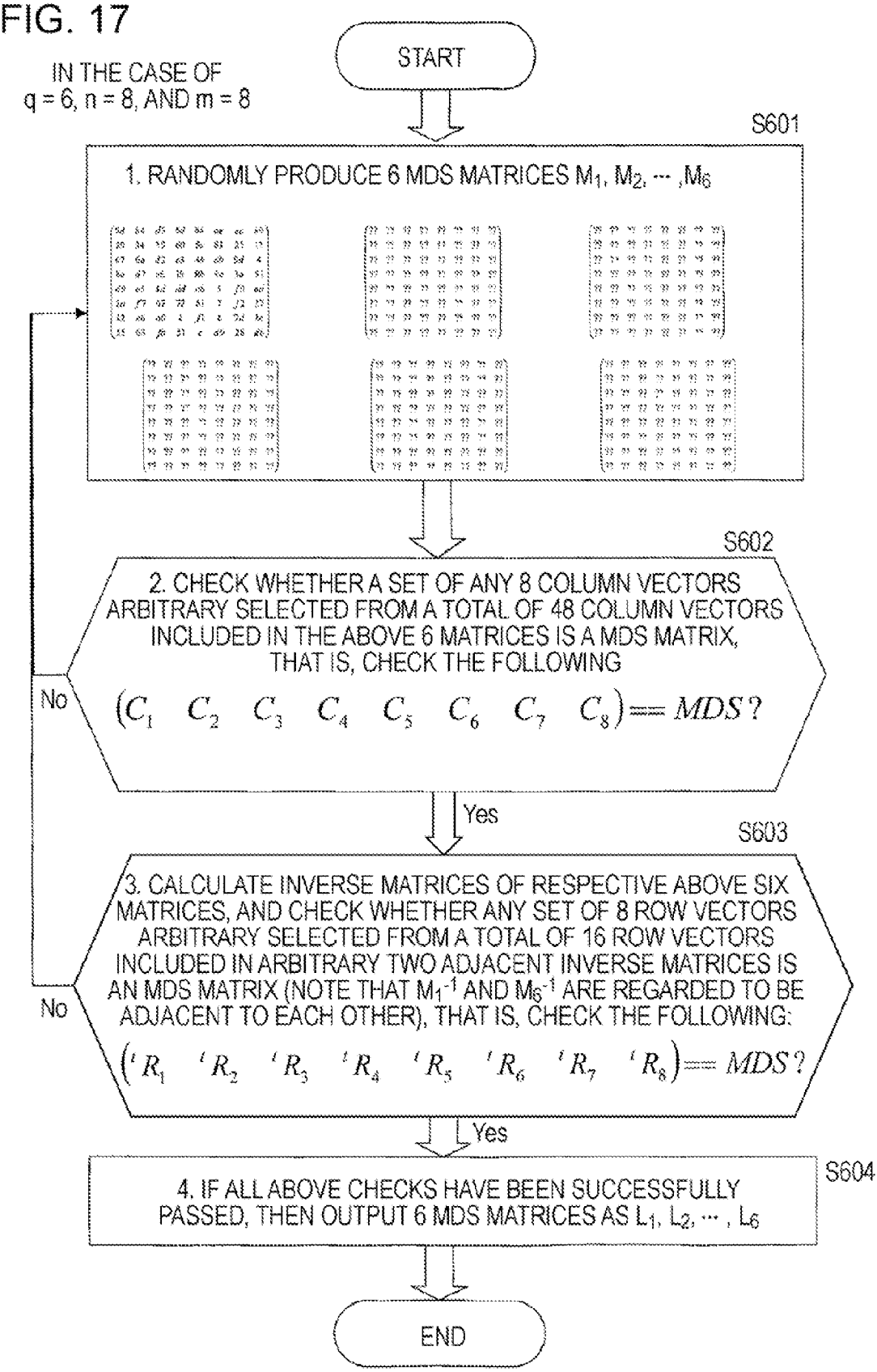
FIG. 17 is a flow chart illustrating an example of a process of producing square MDS matrices used as linear transformation matrices applied to respective rounds of an F-function so that resistance to a differential attack and a linear attack is improved.

Now, referring to FIG. 17, there is described an example of a process of producing square MDS matrices and assigning them to the F-function so as to achieve high resistance to differential attacks and linear attacks. In this example, the process is performed in accordance with a combination of the mode a2 and the mode b2 described above.

[Step S601]

First, the number, q, of necessary square MDS matrices, the degree, n, of the extension field, and the size, m, of the matrices are input.

As many as q square MDS matrices with order m, M1, M2, ..., Mq on GF($2^n$) are randomly produced. Note that in the flow shown in FIG. 17, it is assumed that the number q of square MDS matrices is set to 6, the degree n of the extension field is set to 8, and the size m of matrices is set to 8.

[Step S602]

A check is performed as to whether any m columns arbitrarily selected from a total of qm columns included in q square MDS matrices with an order m M1, M2, ..., Mq form a square MDS matrix. If the above-described check has been successfully passed, the processing flow proceeds to step S603, but otherwise the processing flow returns to step S601.

As described above, when a given matrix satisfies following both conditions (a) and (b), the matrix is said to be a square MDS matrix.

(a) The matrix is in the form of a square matrix.

(b) The determinant of any submatrix included in the matrix is not equal to 0, that is, det(submatrix)—0.

[Step S603]

Inverse matrices $M1^{-1}, M2^{-1}, \ldots, Mq^{-1}$ of respective q square MDS matrices M1, M2, ..., Mq with an order m are calculated, and a check is performed as to whether any m row vectors arbitrarily selected from a total of 2m row vectors included in any two adjacent inverse matrices form a square MDS matrix. In FIG. 17, $^tR$ denotes a transposed vector of a row vector. If the above-described check has been successfully passed, the processing flow proceeds to step S604, but otherwise the processing flow returns to step S601. Note that $M1^{-1}$ and $Mq^{-1}$ are regarded as being adjacent to each other.

[Step S604]

The resultant q square MDS matrices L1, L2, ..., Lq with order m are output for use as square MDS matrices applied to 2r-round Feistel common key block encryption.

As a result of the above-described process, q square MDS matrices with an order m $L_1, L_2, \ldots, L_q$ are produced. Mote that q≦r.

The q square matrices with the order m L1, L2, ..., Lq produced, in the square MDS matrix producing process shown in FIG. 17 are set as matrices applied to the linear transformation part, of the F-function in respective rounds of the 2r-round Feistel common key block encryption process, in accordance with [Step S23] and (Step S24) described above with reference to FIG. 10. More specifically, q square MDS matrices L1, L2, ..., Lq, L1, L2 ... are applied in turn to respective odd rounds of the F-function from up to down, while q square MDS matrices L1, L2, ..., Lq, L1, L2 ... are applied in turn to respective even rounds from bottom, to top.

By assigning square MDS matrices such that the order in which matrices are assigned to even rounds is opposite to the order in which matrices are assigned to odd rounds in the above-described manner, it is guaranteed that encryption and decryption can be performed, in a similar manner except that keys are applied in opposite orders.

In the present mode, it is guaranteed that the following conditions (a) to (c) are satisfied.

(a) The linear transformation matrix used in each F-function should foe a square MDS matrix.

(b) Any m column vectors arbitrarily selected from any of linear transformation matrices used in at least q successive F-functions in odd rounds in an encryption function form a square MDS matrix.

(c) Any m column vectors arbitrarily selected from any of linear transformation matrices used in at least q successive F-functions in even rounds form a square MDS matrix.

Thus, it is guaranteed that, in a Feistel common key block cipher structure with a plurality of rounds according to the present mode, cancellation of differences does not occur as a result of operation by m pieces of or smaller number of active S-boxes through successive (2q−1) rounds.

In the present mode, it is further guaranteed that the following condition is also satisfied.

(d) By property of square MDS matrices, the number of non-zero elements in differential values obtained as a result of operation by a (a≦m) pieces of active S-boxes is equal to or greater than m+1−a. This results in an increase in the minimum number of active S-boxes, as counted over the whole rounds of the F-function.

In the present mode, it is further guaranteed that the following condition is also satisfied.

(e) Any m column vectors arbitrarily included in an inverse matrix of any of linear transformation matrices included in successive odd rounds and even rounds of the encryption function form a square MDS matrix. This makes it possible to increase the degree of difficulty in cryptanalysis using linear approximation in linear attacks, and thus it is possible to realize an encryption algorithm with high security, which makes it difficult to find, keys via cryptanalysis.

As described above, the algorithm according to the present mode makes it possible to realise a high-security cipher which has high resistance to both differential and linear attacks, and thus it is difficult to find keys via cryptanalysis. In the example shown in FIG. 17, as described above, square MDS matrices are produced in accordance with the combination of the mode a2 and the mode b2. Note that the combination is not limited to this, but a combination of modes may be selected from a combination of modes a1 and b1, a combination of modes a1 and b2, a combination of modes a2 and b1, a combination of modes a3 and b1, and a combination of modes a3 and b2. According to the selected combination of modes, q square MDS matrices may be produced, and the produced MDS matrices may be assigned to rounds of the linear transformation process performed by the linear transformation part of the F-function in the 2r-round Feistel common key block encryption process such that More specifically, q square MDS matrices L1, L2, ..., Lq, L1, L2 ... are applied in turn to respective odd rounds from up to down, while q square MDS matrices L1, L2, ..., Lq, L1, L2 ... are applied in turn to respective even rounds from bottom to top, whereby it is possible to realize an encryption process with high resistance to both differential and linear attacks, and thus keys cannot be easily found via cryptanalysis.

In the explanation described above, for ease of understanding, it is assumed that each linear transformation matrix is an m×m matrix defined on GF($2^n$), and data transformation from ran bits to mn bits is performed in accordance with the matrix. Alternatively, an mn×mn matrix defined on GF(2) may foe used to achieve similar high resistance to differential and linear cryptanalysis. Mote that arbitrary matrices on GF($2^n$) correspond in an one-to-one fashion to matrices on GF(2) representing equivalent transformations. Thus, matrices on GF(2) provide more general, expressions. On GF(2), matrices have mn rows and mn columns, which are n times more than the numbers of rows and columns of matrices on GF($2^n$). The first row of a matrix on GF($2^n$) corresponds to first and n-th rows of a matrix on GF(2), and the first column corresponds to first to n-th columns. More generally, an i-th row corresponds to ((i−1)+1)th to ((i−1)+n)th rows, and an i-th column corresponds to ((i−1)−1)th to ((i−1)+n)th columns. Thus, the operation of extracting a row or a column from a matrix on GF($2^n$) corresponds to an operation of extracting n rows or n columns from a matrix on GF(2). The operation of extracting m rows or m columns from a matrix on GF($2^n$) corresponds to an operation of extracting n rows or n columns from a matrix on GF(2) as m times to eventually obtain an mn×mn matrix.

According to the above-described correspondence, it is possible to easily extend the operation to that using matrices on GF(2).

[4. Encryption Algorithm According to the Present Invention]

Mow, an encryption algorithm according to the present invention is described.

As described above in section "3. Examples of Encryption Algorithm with Improved Resistance to Cryptanalysis", when an SPN-type F-function including a nonlinear transformation part and a linear transformation part is executed repeatedly over a plurality of rounds, if the linear transformation is performed using square MDS (Maximum Distance Separable) matrices satisfying particular conditions, it is possible to increase resistance to cryptanalysis or attacks such as linear cryptanalysis or differential cryptanalysis.

However, a problem with the algorithms described above is that usable matrices are limited. That is, to achieve high resistance to differential attacks in one of modes a1 to a3, linear transformation matrices applied to the F-function need to satisfy the following conditions.

(A1) The linear transformation matrix used in each F-function should be a square MDS matrix.

(A2) Any m column vectors arbitrarily selected from any of linear transformation matrices used in at least q successive F-functions in odd rounds in an encryption function are independent or form a square MDS matrix.

(A3) Any m column vectors arbitrarily selected from any of linear transformation matrices used in at least q successive F-functions in even rounds are independent or form at square MDS matrix.

To achieve high resistance to linear attacks in one of modes b1 and b2, linear transformation matrices applied to the F-function need to satisfy the following conditions.

(B1) The linear transformation matrix used in each F-function should be a square MDS matrix.

(B2) Any m column vectors arbitrarily included in an inverse matrix of any of linear transformation matrices included in successive odd rounds and even rounds of the encryption function form a square MDS matrix.

To achieve high resistance to both differential and linear attacks, it is necessary to satisfy all conditions (A1) to (A3) and (B1) and (B2), and thus candidates for usable matrices are further narrowed.

In encryption using the Feistel structure, as described above with reference to FIGS. 1 and 2, plaintext is converted to ciphertext by simply repeating a transformation function. First, plaintext with a length of 2mn bits is divided into two parts each having a length of mn bits, $P_L$ (Plain-Left) data 101 and $P_R$ (Plain-Right) data 102, and these two parts are given as input values to the F-function (round function) 120. For the given input values, F-function 120 is performed repeated over r rounds.

In the example shown in FIG. 1, in the first round, input data X with a length of mn bits and a round key $K_1$ 103 supplied from a key generator (not shown) are input to the F-function 120. The F-function 120 transforms the input data and outputs resultant data Y with a length of ran bits. The output data Y is input to an exclusive OR element 104 and is subjected to an exclusive OR operation with input data provided from the other side of a previous round (in the case of the first round, this input data is $P_L$). Data with a length of mn bits obtained as a result of the operation is output to a next round function. If the above-described process including a predetermined number (r) of repetitions of the F-function, the encryption process is completed. Resultant ciphertext including $C_L$ (Cipher-Right) data and $C_R$ (Cipher-Right) data is output. Kobe that the above-described structure allows it to decrypt the ciphertext simply by applying round keys in a reverse order using the same F-function, and thus an inverse function is not necessary.

The F-function 120 used in each round has a so-called SPN structure including a cascade of a nonlinear transformation layer and a linear transformation layer, as described above with reference to FIG. 2. As shown in FIG. 2(b), the SPN-type F-function 120 has a plurality of 3-boxes 121 for performing a nonlinear transformation process. An input value X with a length of mn bits provided from a previous round of the round function is subjected to an exclusive OR operation with a round key $K_i$ supplied from the key schedule part, and a resultant output is input to the plurality (m) of S-boxes 121 each of which performs a nonlinear transformation process on each n bits of the input. Each S-box performs the nonlinear transformation process, for example, using a transformation table.

An mn-bit output value 2 given as output data from the S-boxes 121 is input to a linear transformation part 122 configured to perform the linear transformation process. The linear transformation part 122 performs the linear transformation process, for example, by exchanging bit positions, on the input mn-bit value Z. The result is output as an mn-bit value Y. The output value Y is then subjected to an exclusive OR operation with input data given by a previous round, and the result is applied as an input value to the F-function in a next round.

In the example of the F-function 120 shown in FIG. 2, the input/output has a length of m×n (m and n are integers) bits, the nonlinear transformation layer includes a parallel array of m S-boxes 121 each having an n-bit input and output, and the linear transformation part 122 functioning as the linear transformation layer performs the linear transformation process in accordance with an m×m square matrix whose elements are on an extension field of degree 2, $GF(2^n)$, defined by an irreducible polynomial of degree n.

Each square matrix used in the linear transformation process performed by the linear transformation part 122 has a structure such as that shown in FIG. 3. In FIG. 3, m n-bit data Z[1], Z[2], ..., Z[m] output front the nonlinear transformation part (the S-box 121) are subjected to the linear transformation in accordance with the predetermined square matrix 125. As a result, Y[1], Y[2], ..., Y[m] are determined and output from the F-function (round function). In this process, the linear operation on the elements of each data by the matrix is performed on the predetermined extension field of degree 2, $GF(2^n)$.

As described above in section "3. Examples of Encryption Algorithm with Improved Resistance to Cryptanalysis", if the linear transformation is performed using square MDS (Maximum Distance Separable) matrices satisfying particular conditions, it is possible to increase resistance to cryptanalysis or attacks such as linear cryptanalysis or differential cryptanalysis. However, as described above, the problem is that candidates for usable matrices are narrowed.

To solve the above problems, two examples of modes of the Feistel common key block encryption algorithm are disclosed below, in which constraint conditions imposed on matrices used in the linear transformation are weakened so that the number of candidates for usable matrices is increased while maintaining the number of active S-boxes to a sufficiently high level.

(4a) Mode 1

First, mode 1 of the Feistel common key block encryption algorithm according to the present invention is described below.

First, optimal diffusion mapping, which is a special form of linear transformations, is defined as follows. When mapping [θ]

$$\theta: \{0,1\}^{na} \rightarrow \{0,1\}^{nb}$$

which linearly transforms n×a bit data into n×b-bit data is given, the number of branches B(θ) is defined as follows.

$$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit.

When B(θ)=b+1 for mapping θ, this mapping θ is said to be optimal diffusion mapping. For convenience the number of branches of a matrix M is denoted by B(M), In the r-round Feistel cipher structure including an SPN-type F-function, $BD_1$ to $BD_3$ are defined as follows, $$BD_1 = \min\{B(M_i) | 1 \leq i \leq r\}$$

$$BD_2 = \min\{B(M_i | M_{i+2}) | 1 \leq i \leq r-2\}$$

where A|B denotes a matrix obtained by connecting matrices A and B.

Furthermore, $BL_2$ is defined as follows, $$BL_2 = \min\{B({}^tM^{-1}{}_i|{}^tM^{-1}{}_{i+2}) | 1 \leq i \leq r-2\}$$

where ${}^tM$ denotes a transposed matrix of M,

The mode 1 of the Feistel encryption algorithm according to the present invention has following features.

(1) Matrices $M_i$ are selected so that $BD_1$ and $BD_2$ are equal to or greater than 3, thereby increasing resistance to differential attacks.

(2) Matrices $M_1$ are selected so that $BL_2$ is equal to or greater than 3, thereby increasing resistance to linear attacks.

In the Feistel common key block encryption algorithm according to the present invention, constraints imposed on matrices used in the linear transformation are only those conditions (1) and (2) described above. Note that those constraints are less tight compared with the constraint conditions imposed on matrices in the algorithm described above in section "3, Examples of Encryption Algorithm with Improved Resistance to Cryptanalysis". The less tight constraints allow an increase in the number of candidates for matrices usable in the Feistel common key block encryption algorithm, while maintaining the number of active S-boxes to a sufficiently high level. This makes it possible to increase the minimum number of active S-boxes as counted over all rounds of the encryption function, which is one of measures of the degree of resistance of common key block ciphers against attacks, and thus it is possible to realize an algorithm of encrypting data in a highly secure manner so that high resistance to linear attacks and differential attacks is achieved.

Next, there are given below reasons and proof that the condition (1) allows an increase in resistance to differential attacks, and the condition (2) allows an increase in resistance to linear attacks.

(4a. 1) Improvement in Resistance to Differential Attacks Achieved In Mode 1

First, reasons are described why high resistance to differential attacks can be achieved by satisfying the above-described condition (1) that matrices Mb are selected so that $BD_1$ and $BD_2$ are equal to or greater than 3.

In the r-round Feistel cipher based on the SPN-type F-function, $BD_1$ to $BD_2$ are defined as follows.

$$BD_1 = \min\{B(M_i) | 1 \leq i \leq r\}$$

$$BD_2 = \min\{B(M_i | M_{i+2}) | 1 \leq i \leq r-2\}$$

where A|B denotes a matrix obtained by connecting matrices A and B.

Herein, the following condition holds.

Condition 0) $BD_1 \geq BD_2$

If the number of S-boxes (differentially active S-boxes) having non-zero inputs and outputs existing in a k-th round is denoted by $D_K$, then the following holds.

When a non-zero input difference is given to a Feistel cipher with an SPN-type F-function, the following conditions hold.

Condition 1) If $D_i = 0$, then $D_{i-2} \neq 0$, $D_{i-1} \neq 0$, $D_{i+1} \neq 0$, and $D_{i+2} \neq 0$ Condition 2) If $D_i = 0$, then $D_{i-1} = D_{i+1}$ Condition 3) If $D_{i+1} \neq 0$, then $D_i + D_{i+1} + D_{i+2} \geq BD_1$ Condition 4) If $D_i = 0$, then $D_{i+1} + D_{i+2} \geq BD_1$ Condition 5) If $D_{i+2} = 0$, then $D_i + d_{i+1} \geq BD_1$ Condition 6) if $D_i = 0$, then $D_{i+1} + D_{i+3} + D_{i+4} \geq BD_2$ Condition 7) If $D_{i+4} = 0$, then $D_i + D_{i+1} + D_{i+3} \geq BD_2$ The total number, $T_6$, of differentially active S-boxes included in successive six rounds (that is, $T_6 = D_i + D_{i+1} + D_{i+2} + d_{i+3} + d_{i+4} + D_{i+5}$) is discussed below.

Case 1) When $D_{i+1} \neq 0$ and $D_{i+4} \neq 0$, the following holds from the condition 3, $$D_i + D_{i+1} + d_{i+2} \geq BD_1 \text{ and } D_{i+3} + D_{i+4} + d_{i+5} \geq BD_1$$

Thus, $$T_6 \geq 2BD_1$$

Case 2) When $D_{i+1} = 0$, $$T_6 = 2D_{i+2} + D_{i+3} + D_{i+4} + d_{i+5}$$

Thus, from the condition 2, $$T_6 = 2D_{i+2} + D_{i+3} + D_{i+4} + d_{i+5}$$

Furthermore, form the conditions 4 and 6, $$T_6 = (D_{i+2} + d_{i+3}) + (D_{i+2} + D_{i+4} + D_{i+5}) \geq BD_1 + BD_2.$$

Case 3) When $D_{i+4} = 0$, the following can be derived in a similar manner to the case (2).

$$T_6 \geq BD_1 + BD_2$$

From the above and the condition (0), $$T_6 \geq BD_1 + BD_2$$

From the property that a multiple of 6, that is, 6R (R≧2), can be divided into R pieces of 6s, it is possible to calculate the minimum number of differentially active S-boxes included over 6R rounds from the above described number of differentially active S-boxes guaranteed in the six rounds.

That is, the minimum number of S-boxes (differentially active S-boxes) having non-zero differential inputs/outputs can be expressed using $BD_1$ and $BD_2$. It is known, as design philosophy, to achieve as great $BD_1$ as possible however, use of the same matrix for all rounds leads to $BD_2 = 2$, and thus an increase in the minimum number of differentially active S-boxes is not achieved.

In contrast, in the algorithm according to the present mode of the invention, as described above, the condition that $BD_1 \geq BD_2$ holds, and thus it is possible to increase the minimum number of S-boxes (differentially active S-boxes) having non-zero differential inputs/outputs by setting Bib to be great enough.

In the algorithm described above in section "3. Examples of Encryption Algorithm with Improved Resistance to Cryptanalysis", in order to achieve high resistance to differential attacks, linear transformation matrices used in respective rounds of F-function need to satisfy the following conditions.

(A1) The linear transformation matrix used in each F-function should be a square MDS matrix.

(A2) Any m column vectors arbitrarily selected from any of linear transformation matrices used in at least q successive F-functions in odd rounds in an encryption function are independent or form a square MDS matrix.

(A3) Any m column vectors arbitrarily selected from any of linear transformation matrices used in at least q successive F-functions in even rounds are independent or form a square MDS matrix.

Using the following expression $$BD_1 = \min\{B(M_i) | 1 \leq i \leq r\}, \text{ and}$$

$$BD_2 = \min\{B(M_i | M_{i+2}) | 1 \leq i \leq r-2\}$$

the above conditions (A1) to (A3) are equivalent to the following condition.

$$BD_1 = BD_2 = m+1$$

In the above-described algorithm according to the present mode of the invention, because the condition that $BD_1 \geq BD_2$ holds, it is possible to increase the minimum number of differentially active S-boxes by setting $BD_2$ to be sufficiently large This brings about an advantage that the number of candidate for matrices used in the linear transformation performed by the F-function, and the number of differentially active S-boxes having non-zero differential inputs/outputs is maintained to a sufficiently large level. This makes it possible to increase the minimum number of active S-boxes as counted over all rounds of the encryption function, which is one of measures of the degree of resistance of common key block ciphers against attacks, and thus it is possible to realize an algorithm of encrypting data in a highly secure manner so that high resistance to differential attacks is achieved.

(4a. 2) Improvement in Resistance to Linear Attacks Achieved in Mode 1

Now, there is described a reason why high resistance to linear attacks can be achieved by the condition (2), that is, by selecting matrices $M_i$ so that $BL_2$ is equal to or greater than 3. $BL_2$ is defined as follows.

$$BL_2 = \min\{B({}^tM^{-1}_i | {}^tM^{-1}_{i+2}+1 \leq i \leq r-2\}$$

where ${}^tM$ denotes a transposed matrix of M,

If the number of S-boxes (linearly active S-boxes) having at non-zero linear input/output mask existing in a k round is denoted by $L_k$, then the following holds.

When a non-zero input linear mask is given to a Feistel cipher with an SPN-type F-function, the following condition always holds.

$$L_i + L_{i+1} + L_{i+2} \geq BL_2 \qquad \text{Condition 1)}$$

Any multiple of 3, that is, 3R (R≧1), can be divided into a plurality of pieces of 3s. Therefore, it is ensured that the minimum number of linearly active S-boxes over 3R rounds is given by R×$BL_2$. Thus, it is possible to increase the minimum number of active S-boxes by setting $BL_2$ to be sufficiently large.

In the algorithm described above in section "3. Examples of Encryption Algorithm with Improved Resistance to Cryptanalysis", in order to achieve high resistance to linear attacks, linear transformation matrices used in respective rounds of F-function need to satisfy the following conditions.

(B1) The linear transformation matrix used in each F-function should be a square MDS matrix.

(B2) Any m column vectors arbitrarily included in an inverse matrix of any of linear transformation matrices included in successive odd rounds and even rounds of the encryption function form a square MDS matrix.

Using the following expression defining $BL_2$ $$BL_2 = \min\{B({}^tM^{-1}_i | {}^tM^{-1}_{i+2} | 1 \leq i \leq r-2\}$$

the above conditions (B1) to (B2) can be represented, by a following equivalent expression, $$BL_2 = m+1$$

In the above-described algorithm according to the present mode of the invention, the only constraint is that matrices $M_i$ should be selected so that $BL_2$ is equal to or greater than 3.

Therefore, it is guaranteed that the minimum number of linearly active S-boxes over 3R rounds is given by R×$BL_2$. Thus, it is possible to increase the minimum number of linearly active S-boxes by setting $BL_2$ to be sufficiently large. This makes it possible to increase the minimum number of active S-boxes as counted, over all rounds of the encryption function, which is one of measures of the degree of resistance of common key block ciphers against attacks, and thus it is possible to realize an algorithm of encrypting data in a highly secure manner so that high resistance to linear attacks is achieved.

Note that the conditions described above, that is, (1) Matrices $M_i$ are selected so that $BD_1$ and $BD_2$ are equal to or greater than 3.

(2) Matrices $M_i$ are selected so that $BL_2$ is equal to or greater than 3 are defined independently of each other. The resistance to differential attacks can be increased by satisfying the condition (1), while the resistance to linear attacks can be increased by satisfying the condition (2).

The "condition (1) for ensuring high resistance to differential attacks" and the "condition (2) for ensuring high resistance to linear attacks" described above are defined independently of each other. In general, matrices are selected so that a similar degree of resistance is achieved for both types of attacks. However, depending on a situation in which ciphers are used, matrices may be selected so that high resistance to differential attacks is achieved without consideration of resistance to linear attacks, or vice versa.

(4b) Mode 2

Next, mode 2 of the Feistel common key block encryption algorithm according to the present invention is described below. Compared with mode 1 described above, tight constraints are imposed on matrices.

First, optimal diffusion mapping, which is a special form of linear transformations, is defined as follows. When mapping [θ]

$$\theta: \{0,1\}^{na} \to \{0,1\}^{nb}$$

which linearly transforms n×a bit data into n×b-bit data is given, the number of branches B(θ) is defined as follows.

$$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit.

When B(θ)=b+1 for mapping θ, this mapping θ is said to be optimal diffusion mapping. For convenience the number of branches of a matrix M is denoted by B(M).

In the r-round Feistel cipher structure including an SPN-type F-function, $BD_1$ to $BD_3$ are defined, as follows.

$$BD_1 = \min\{B(M_i) | 1 \leq i \leq r\}$$

$$BD_2 = \min\{B(M_i + M_{i+2}) | 1 \leq i \leq r-2\}$$

$$BD_3 = \min\{B(M_i | M_{i+2} | M_{i+4}) | 1 \leq i \leq r-4\}$$

where A|B denotes a matrix obtained by connecting matrices A and B.

Herein, $BL_2$ is defined as follows.

$$BL_2 = \min\{B({}^tM^{-1}{}_i|{}^tM^{-1}{}_{i+2}) | 1 \leq i \leq r-2\}$$

where ${}^tM$ denotes a transposed matrix of M.

As described above, in the Feistel encryption algorithm according to the present invention, matrices are selected as follows.

(1) Matrices $H_i$ are selected so that $BD_1$, $BD_2$, and $BD_3$ are equal to or greater than 3, thereby increasing resistance to differential attacks, and/or (2) Matrices $M_i$ are selected so that $BL_2$ is equal to or greater than 3, thereby increasing resistance to linear attacks.

In the Feistel common key block encryption algorithm according to the present invention, constraints imposed on matrices used in the linear transformation are only those conditions (1) and (2) described above. Note that those constraints are less tight compared with the constraint conditions imposed on matrices in the algorithm described above in section "3. Examples of Encryption Algorithm with Improved Resistance to Cryptanalysis". The less tight constraints allow an increase in the number of candidates for matrices usable in the Feistel common key block encryption algorithm, while maintaining the number of active S-boxes to a sufficiently high level. This makes it possible to increase the minimum number of active S-boxes as counted over all rounds of the encryption function, which is one of measures of the degree of resistance of common key block ciphers against attacks, and thus it is possible to realize an algorithm of encrypting data in a highly secure manner so that high resistance to linear attacks and differential attacks is achieved.

Next, there are given below reasons and proof that the condition (1) allows an increase in resistance to differential attacks and the condition (2) allows an increase in resistance to linear attacks.

(4b. 1) Improvement in Resistance to Differential Attacks Achieved in Mode 2

First, there is described a reason why high resistance to differential attacks can be achieved by satisfying the above-described condition (1) that matrices $M_i$ are selected so that $BD_1$, $BD_2$, and $BD_3$ are equal to or greater than 3.

In the r-round Feistel cipher based on the SPN-type F-function, $BD_1$ to $BD_3$ are defined as follows.

$$BD_1 = \min\{B(M_i) | 1 \leq i \leq r\}$$

$$BD_2 = \min\{B(M_i|M_{i+2}) | 1 \leq i \leq r-2\}$$

$$BD_3 = \min\{B(M_i|M_{i+2}|M_{i+4}) | 1 \leq i \leq r-4\}$$

where A|B denotes a matrix obtained by connecting matrices A and B.

Herein, the following condition holds.

Condition 0) $BD_1 \geq BD_2 \geq BD_3$

If the number of S-boxes (differentially active S-boxes) having non-zero inputs and outputs existing in a k-th round is denoted by $D_k$, then the following holds.

When a non-zero input difference is given to a Feistel cipher with an SPN-type F-function, the following conditions hold.

Condition 1) If $D_i = 0$, then $D_{i-2} \neq 0$, $D_{i-1} \neq 0$, $D_{i+1} \neq 0$, and $D_{i+2} \neq 0$ Condition 2) If $D_i = 0$, then $D_{i-1} = D_{i+1}$ Condition 3) If $D_{i+1} \neq 0$, then $D_i + D_{i+1} + D_{i+2} \geq BD_1$ Condition 4) If $D_i = 0$, then $D_{i+1} + d_{i+2} \geq BD_1$ Condition 5) If $D_{i+2} = 0$, then $D_i + D_{i+1} \geq BD_1$ Condition 6) If $D_i = 0$, then $D_{i+1} + D_{i+3} + D_{i+4} \geq BD_2$ Condition 7) If $D_{i+4} = 0$, then $D_i + D_{i+1} + d_{i+} \geq BD_2$ Condition 8) If $D_i = D_{i+6} = 0$, then $D_{i+1} + D_{i+3} + D_{i+5} \geq BD_3$ The total number, $T_6$, of differentially active S-boxes included in successive six rounds (that is, $T_6 = D_i + D_{i+1} + D_{i+2} + d_{i+3} + d_{i+4} + D_{i+5}$) is discussed below.

Case 1) When $D_{i+1} \neq 0$ and $D_{i+4} \neq 0$, the following is derived from the condition (3).

$$D_i + D_{i+1} + D_{i+2} \geq BD_1 \text{ and } D_{i+3} + D_{i+4} + D_{i+5} \geq BD_1.$$

Thus, $$T_6 \geq 2BD_1$$

Case 2) When $D_{i+1} = 0$, $$T_6 = D_i + D_{i+1} + D_{i+2} + D_{i+3} + D_{i+4} + D_{i+5}.$$

Furthermore, from the condition 2, $$T_6 = 2D_{i+2} + D_{i+3} + D_{i+4} + d_{i+5}.$$

From the conditions 4 and 6, $$T_6 = (D_{i+2} + d_{i+3}) + (D_{i+2} + D_{i+4} + D_{i+5}) \pm BD_1 + BD_2.$$

Case 3) When $D_{i+4} = 0$, the following can be derived in a similar manner to the case 2, $$T_6 \geq BD_1 + BD_2$$

From the above and the condition 0, $$T_6 \geq BD_1 + BD_2$$

Next, the total number of differentially active S-boxes as counted over successive 9 rounds is discussed. The total number is given by $$T_9 = (D_i + d_{i+1} + D_{i+2} + d_{i+3} + D_{i+4} + D_{i+5} + D_{i+6} + D_{i+7} + D_{i+8}).$$

Case 1) When $D_{i+1} \neq 0$, the following is derived from the condition 3.

$$D_i + D_{i+1} + D_{i+2} \geq BD_1$$

From the total number of differentially active S-boxes over six rounds, the following is derived.

$$D_{i+3} + d_{i+4} + d_{i+5} + D_{i+6} + D_{i+7} + D_{i+8} \geq BD_1 + BD_2$$

Thus $$T_9 \geq 2BD_1 + BD_2$$

Case 2) When $D_{i+7} \neq 0$, the following can be derived in a similar manner to the case 1.

$$T_9 \geq 2BD_1 + BD_2$$

Case 3) When $D_{i+1} = D_{i+7} = 0$, $T_9$ is calculated as $T_9 = D_i + D_{i+1} + D_{i+2} + D_{i+3} + D_{i+4} + D_{i+5} + D_{i+6} + D_{i+7} + D_{i+8}$.

From the condition 2, the following is derived.

$$T_9 = 2D_{i+2} + D_{i+3} + D_{i+4} + D_{i+5} + D_{i+6}.$$

Furthermore, from the conditions 4 and 8, the following is derived.

$$T_9 = (D_{i+2} + D_{i+3}) + (D_{i+2} + D_{i+4} + D_{i+6}) + (D_{i+5} + D_{i+6})$$
$$\{>\} = 2BD_1 + BD_3.$$

From the above and the condition (0), the following can be derived.

$$T9 \geq 2BD_1 + BD_3.$$

Any multiple of 3 equal to or greater than 6, that is, 3R ($R \geq 2$), can be divided into a plurality of 6s plus a plurality of 9s. Some examples are shown below.

Examples) 6=6, 9=9, 12=6+6, 15=6+9, 18=6+6+6=9+9, 21=6+6+9, 24=6+6+6+6=9+9+6, . . . .

From the above-described property that any multiple of 3 equal to or greater than 6, that is, 3R (R≧2), can be divided into a plurality of 6s plus a plurality of 9s, the minimum number of differentially active S-boxes over 3R rounds can be determined from the number of differentially active S-boxes as counted over 6 rounds and that as counted over 9 rounds.

That is, the minimum number of S-boxes (differentially active S-boxes) having non-zero differential inputs/outputs can be expressed using $BD_1$, $BD_2$, and $BD_3$. It is known, as design philosophy, to achieve as great $BD_1$ as possible. However, use of the same matrix for all rounds leads to $BD_2=BD_3=2$, and thus an increase in the minimum number of differentially active S-boxes is not achieved.

In the above-described proof, it is assumed that the following constraint condition is satisfied.

$$BD_1 \geq BD_2 \geq BD_3$$

Thus it is possible to increase the minimum number of S-boxes (differentially active S-boxes) having non-zero differential inputs/outputs by setting $BD_3$ to be great enough.

In the algorithm described above in section "3. Examples of Encryption Algorithm with Improved Resistance to Cryptanalysis", in order to achieve high resistance to differential attacks, linear transformation matrices used in respective rounds of F-function need to satisfy the following conditions.

(A1) The linear transformation matrix used in each F-function should be a square MDS matrix.

(A2) Any m column vectors arbitrarily selected from any of linear transformation matrices used in at least q successive F-functions in odd rounds in an encryption function are independent or form a square MDS matrix.

(A3) Any m column vectors arbitrarily selected from any of linear transformation matrices used in at least q successive F-functions in even rounds are independent or form a square MDS matrix.

Using the following expression defining $BD_1$ to $BD_3$ $$BD_1 = \min\{B(M_i)|1 \leq i \leq r\}$$

$$BD_2 = \min\{B(M_i|M_{i+2})|1 \leq i \leq r-2\}$$

$$BD_3 = \min\{B(M_i|M_{i+2}|M_{i+4})|1 \leq i \leq r-4\}$$

the above conditions (A1) to (A3) can be rewritten in an equivalent expression as follows.

$$BD_1 = BD_2 = BD_3 = m+1$$

In the above-described algorithm according to the present mode of the invention, because the condition $BD_1 \geq BD_2 \geq BD_3$ holds, it is possible to increase the minimum number of differentially active S-boxes by setting $BD_3$ to be sufficiently large This brings about an advantage that the number of candidate for matrices used in the linear transformation performed by the F-function, and the number of differentially active S-boxes having non-zero differential inputs/outputs is maintained to a sufficiently large level. This makes it possible to increase the minimum number of active S-boxes as counted, over all rounds of the encryption function, which is one of measures of the degree of resistance of common key block ciphers against attacks, and thus it is possible to realize an algorithm of encrypting data in a highly secure manner so that high resistance to differential attacks is achieved.

(4b, 2) Improvement in Resistance to Linear Attacks Achieved in Mode 2

Now, there is described a reason why high resistance to linear attacks can be achieved by the condition (2), that is, by selecting matrices $M_i$ so that $BD_2$ is equal to or greater than 3.

$BL_2$ is defined as follows.

$$BL_2 = \min\{B({}^tM^{-1}_i|{}^tM^{-1}_{i+2}|1 \leq i \leq r-2\}$$

where ${}^tM$ denotes a transposed matrix of M,

If the number of S-boxes (linearly active S-boxes) having a non-zero linear input/output mask existing in a k round is denoted by $L_k$, then the following holds.

When a non-zero input linear mask is given to a Feistel cipher with an SPN-type F-function, the following condition always holds.

$$L_i + L_{i+1} + L_{i+2} \geq BL_2 \qquad \text{Condition 1)}$$

Any multiple of 3, that is, 3R (R±1), can be divided into a plurality of pieces of 3. Therefore, it is ensured that the minimum number of linearly active S-boxes over 3R rounds is given by $R \times BL_2$. Thus, it is possible to increase the minimum number of active S-boxes by setting $BL_2$ to be sufficiently large.

In the algorithm described above in section "3. Examples of encryption Algorithm with Improved Resistance to Cryptanalysis", in order to achieve high resistance to linear attacks, linear transformation matrices used in respective rounds of F-function need to satisfy the following conditions.

(B1) The linear transformation matrix used in each F-function should be a square MDS matrix.

(B2) Any m column vectors arbitrarily included in an inverse matrix of any of linear transformation matrices included in successive odd rounds and even rounds of the encryption function form a square MDS matrix.

Using the following expression defining $BL_2$ $$BL_2 = \min\{B({}^tM^{-1}_i|{}^tM^{-1}_{i+2}|1 \leq i \leq r-2\}$$

the above conditions (B1) to (B2) can be rewritten in an equivalent expression as follow.

$$BL_2 = m+1$$

In the above-described algorithm according to the present mode of the invention, on the following constraint is imposed on the selection of matrices.

Matrices $M_i$ should foe selected so that $BL_2$ is equal to or greater than 3.

Therefore, it is guaranteed that the minimum number of linearly active S-boxes over 3R rounds is given by $R \times BL_2$. Thus, it is possible to increase the minimum number of linearly active S-boxes by setting $BL_2$ to be sufficiently large. This makes it possible to increase the minimum number of active S-boxes as counted over all rounds of the encryption function, which is one of measures of the degree of resistance of common key block ciphers against attacks, and thus it is possible to realize an algorithm of encrypting data in a highly secure manner so that high resistance to linear attacks is achieved.

Note that the conditions described above, that is, (1) Matrices $M_i$ are selected so that $BD_1$, $BD_2$, and $BD_3$ are equal to or greater than 3, and (2) Matrices $M_i$ are selected so that $BL_2$ is equal to or greater than 3, are defined independently of each other. The resistance to differential attacks can be increased by satisfying the condition (1), while the resistance to linear attacks can be increased by satisfying the condition (2).

The "condition (1) for ensuring high resistance to differential attacks" and the "condition. (2) for ensuring high resistance to linear attacks" described above are defined independently of each other. In general, matrices are selected so that a similar degree of resistance is achieved for both types of attacks. However, depending on a situation in which ciphers are used, matrices may be selected so that high resistance to differential attacks is achieved without consideration of resistance to linear attacks, or vice versa.

Figure 18:
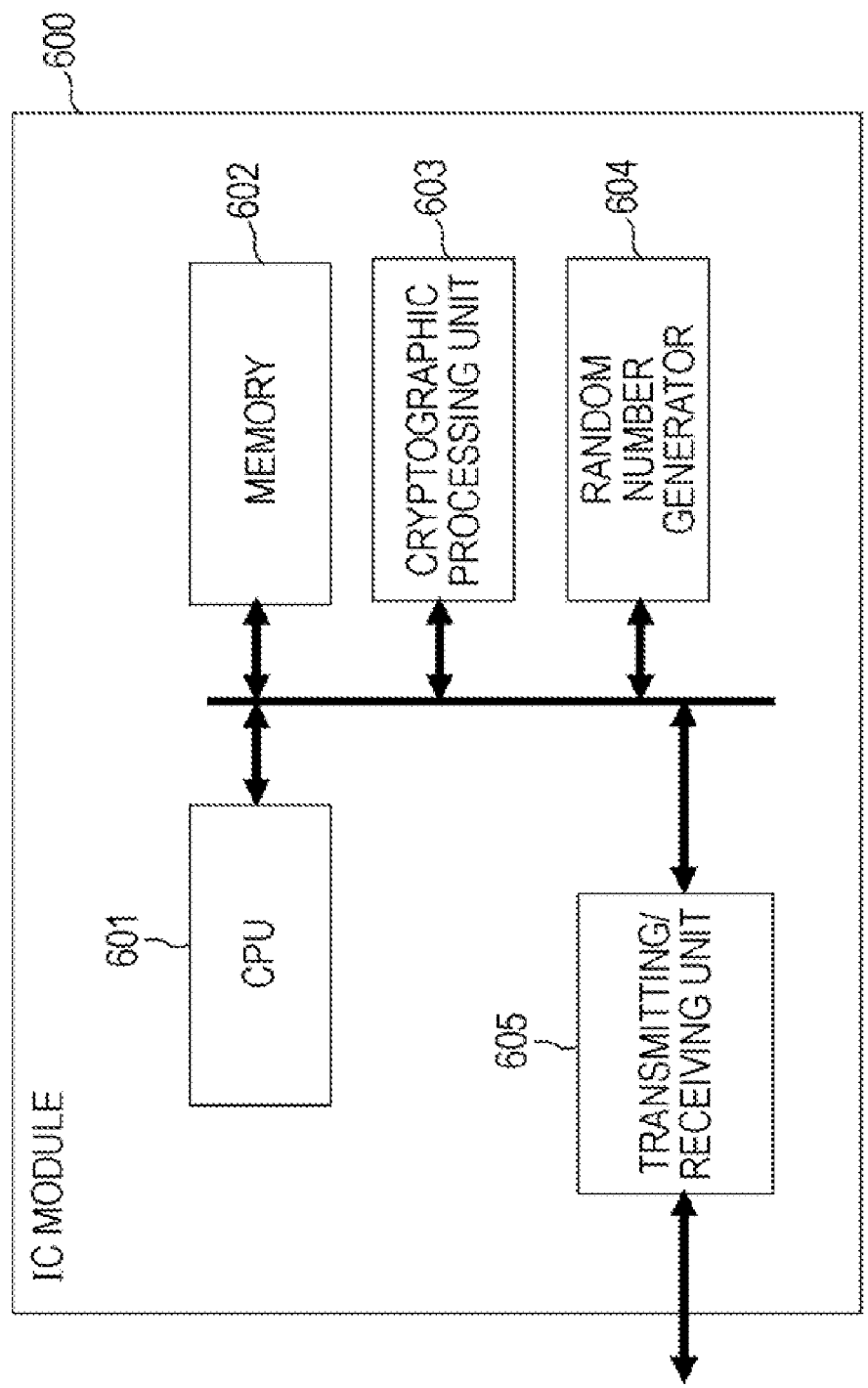
FIG. 18 is a diagram illustrating an example of a configuration of an IC module serving as a cryptographic processing apparatus adapted to perform a cryptographic process according to the present invention.

FIG. 18 illustrates an example of a configuration of an IC module 600 serving as a cryptographic processing apparatus adapted, to perform the cryptographic process. The process described above can be performed in a wide variety of information processing apparatus such as a PC, an IC card, and a reader/writer. The IC module 600 shown in FIG. 18 may be configured to provide desired one or more such functions.

In FIG. 18, a CPU (Central Processing Unit) 601 is a processor configured to control start/end of the cryptographic process, a transmitting/receiving operation of data, and transferring of data among various units, and to execute various kinds of other programs. A memory 602 includes a ROM (Read Only Memory) and a RAM (Random Access Memory). The ROM is used to store a program executed by the CPU 601. The ROM is also used to store fixed data of operation parameters. The RAH is used as a work area or a storage area for storing a program executed by the CPU 601 and for storing parameters which vary during the execution of the program. The memory 602 may also be used as a storage area for storing key data or the like necessary in the cryptographic process. It is desirable that the data storage area be configured so as to be secure against tampering.

A cryptographic processing unit 603 performs an encryption/decryption process according to the Feistel common key block encryption algorithm described above. Although in the present example, the cryptographic: processing means is implemented in the form of a separate module, the cryptographic processing means may be implemented in a different manner. For example, a cryptographic processing program stored in the ROM may be read and executed by the CPU 601 thereby implementing the cryptographic processing means.

A random number generator 604 generates a random number necessary in production of a key in the cryptographic process.

A transmitting/receiving unit 605 is a data communication processing unit configured to perform data communication between the IC module and an external apparatus such as a reader/writer. More specifically, the transmitting/receiving unit 605 outputs encrypted data generated in the IC module and receives data from the external apparatus such as the reader/writer.

The present invention has been described above with reference to specific embodiments. It should be apparent to those skilled in the art that various modifications and substitutions are possible without departing from the spirit and the scope of the invention, that is, the embodiments have been described above by way of example and not limitation. The scope of the invention is to be determined solely by the claims.

In the embodiments described above, constraint conditions are given by two or three determinants. Constraint conditions may be given by an arbitrary number of determinants, and resistance to differential attacks and linear attacks can foe increased by satisfying the constraint conditions.

Any of the processes disclosed in the present description may be performed by means of hardware, software, or a combination of hardware and software. In the case in which a process is performed by means of software, a program of the process may be installed into a memory disposed in a dedicated computer embedded in hardware and the program may be executed by the computer, or the program may be installed on a general-purpose computer capable of executing various processes and may be executed on the general-purpose computer.

The program may be stored in advance in a storage medium such as a hard disk or a ROM (Read Only Memory). The program may also be temporarily or permanently stored, in a removable storage medium such as a flexible disk, a CD-ROM (Compact Disc Read Only Memory), an MO (Magneto-optical) disk, a DVD (Digital Versatile Disc), a magnetic disk, or a semiconductor memory. The program stored on such a removable storage medium may be supplied in the form of so-called packaged software.

Instead of installing the program from the removable storage medium onto the computer, the program may also be transferred to the computer from a download site via radio transmission or via a network such as an LAM (Local Area Network) or the Internet by means of wire communication. In this case, the computer receives the program transmitted in the above-described manner and installs the program on a storage medium such as a hard disk disposed in the computer.

The processes disclosed in the present description may be performed time-sequentially in the same order as that described in the program, or may foe performed in parallel or individually depending on the processing power of the computer. In the present description, the term "system" is used to describe a logical collection of a plurality of devices, and it is not necessarily required that the plurality of devices be disposed in a single case.

INDUSTRIAL APPLICABILITY

As described above, the present invention provides a Feistel common key block encryption algorithm. In this algorithm, an SPN-type F-function including a nonlinear transformation part and a linear transformation part is performed repeatedly over a plurality of rounds. In the algorithm, a linear transformation process is performed in each of a plurality of rounds in accordance with the F-function using a matrix determined so as to satisfy a relatively loose constraint whereby high resistance of a common key block cipher against differential attacks and/or linear attacks is achieved. The relatively loose constraint allows an increase in the number of candidates for usable matrices, and it is possible to maintain the number of active S-boxes to a sufficiently large level. This makes it possible to increase the minimum number of active S-boxes as counted over all rounds of the encryption function, which is one of measures of the degree of resistance of common key block ciphers against attacks, and thus it is possible to realize an algorithm of encrypting data in a highly secure manner so that high resistance to linear attacks and differential attacks is achieved.

The invention claimed is:

1. A cryptography processing apparatus adapted to perform a cryptographic process, the apparatus comprising:
   a processor; and
   a non-transitory computer-readable memory comprising instructions for carrying out the functions of:
      a nonlinear transformation process including a plurality of nonlinear transformation layers each having an input and an output of a plurality of bits, and
      a linear transformation process,
   wherein the linear transformation process uses matrices satisfying a constraint condition,
   wherein:
      the input to the nonlinear transformation process has a length of 2m×n bits, where m and n are integers,
      the output from the nonlinear transformation layers has a length of m×n bits,
      the linear transformation process transforms the output of the nonlinear transformation layers using an F-function in each of r rounds, and
      the F-function performs the linear transformation process according to a matrix $M_i$, where the matrix $M_i$ is a m×m square matrix whose elements are on an extension field of degree 2, $GF(2^n)$, defined by an irreducable polynomial of degree n, and wherein the constraint condition imposed on matrices used in the linear transformation process is given as follows:

when parameters are defined such that for a matrix $M_i$ implementing a mapping $\theta: \{0, 1\}^{na} \to \{0, 1\}^{nb}$ which performs a linear transformation from n×a bit data into n×b-bit data in the linear transformation process using the F-function in each of r rounds, the number of branches $B(\theta)$ is defined by $B(\theta) = \min_{\alpha \neq 0} \{hw_n(\alpha) + hw_n(\theta(\alpha))\}$ where $\min_{\alpha \neq 0} \{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BD_1$ and $BD_2$ are defined by $BD_1 = \min\{B(M_i) | 1 \leq i \leq r\}$ $BD_2 = \min\{B(M_i | M_{i+2}) | 1 \leq i \leq r-2\}$ where B(M) denotes the number of branches of a matrix M, and A|B denotes a matrix obtained by connecting matrices A and B, and the matrix $M_i$ is determined so that $BD_1$ and $BD_2$ are both equal to or greater than 3.

2. A cryptographic processing apparatus comprising:

a processor; and a memory, wherein the processor and the memory are configured to perform:

a cryptographic process using an r-round common key block cipher structure including an SPN-type F-function including a nonlinear transformation part and a linear transformation part, wherein:

an input to the nonlinear transformation part has a length of 2m×n bits, where m and n are integers, an output from the nonlinear transformation part has a length of m×n bits, the linear transformation process transforms the output of the nonlinear transformation part using the F-function in each of r rounds, and the F-function performs the linear transformation part according to a matrix $M_i$, where the matrix $M_i$ is a m×m square matrix whose elements are on an extension field of degree 2, $GF(2^n)$, defined by an irreducable polynomial of degree n, wherein matrix $M_i$ satisfies the following condition:

when parameters are defined such that for a mapping $\theta: \{0, 1\}^{na} \to \{0, 1\}^{nb}$ which performs a linear transformation from n×a bit data into n×b-bit data, the number of branches $B(\theta)$ is defined by $B(\theta) = \min_{\alpha \neq 0} \{hw_n(\alpha) + hw_n(\theta(\alpha))\}$ where $\min_{\alpha \neq 0} \{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BD_1$, $BD_2$, and $BD_3$ are defined by $BD_1 = \min\{B(M_i) | 1 \leq i \leq r\}$ $BD_2 = \min\{B(M_i | M_{i+2}) | 1 \leq i \leq r-2\}$, and $BD_3 = \min\{B(M_i | M_{i+2} | M_{i+4}) | 1 \leq i \leq r-4\}$ where B(M) denotes the number of branches of a matrix M, and A|B denotes a matrix obtained by connecting matrices A and B, the matrix $M_i$ is determined so that $BD_1$, $BD_2$ and $BD_3$ all are equal to or greater than 3.

3. A cryptographic processing apparatus comprising:

a processor; and a memory, wherein the processor and the memory are configured to perform:

a cryptographic process using an r-round common key block cipher structure including an SPN-type F-function including a nonlinear transformation part and a linear transformation part, wherein:

an input to the nonlinear transformation part has a length of 2m×n bits, where m and n are integers, an output from the nonlinear transformation part has a length of m×n bits, the linear transformation process transforms the output of the nonlinear transformation part using the F-function in each of r rounds, and the F-function performs the linear transformation part according to a matrix $M_i$, where the matrix $M_i$ is a m×m square matrix whose elements are on an extension field of degree 2, $GF(2^n)$, defined by an irreducable polynomial of degree n, wherein the matrix $M_i$ satisfies the following condition:

when parameters are defined such that:

for a mapping $\theta: \{0, 1\}^{na} \to \{0, 1\}^{nb}$ which performs a linear transformation from n×a bit data into n×b-bit data, the number of branches $B(\theta)$ is defined by $B(\theta) = \min_{\alpha \neq 0} \{hw_n(\alpha) + hw_n(\theta(\alpha))\}$ where $\min_{\alpha \neq 0} \{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BL_2$ is defined by $BL_2 = \min\{B({}^tM^{-1}_i | {}^tM^{-1}_{i+2}) | 1 \leq i \leq r-2\}$ where B(M) denotes the number of branches of a matrix M, and ${}^tM$ denotes a transposed matrix of M, the matrix $M_i$ is determined so that $BL_2$ is equal to or greater than 3.

4. A computer-implemented cryptographic processing method for executing, by a processor, a cryptographic process using a common key block structure, comprising the step of:

executing an SPN-type F-function including a nonlinear transformation part and a linear transformation part repeatedly over r rounds, wherein:

an input to the nonlinear transformation part has a length of 2m×n bits, where m and n are integers, an output from the nonlinear transformation part has a length of m×n bits, the linear transformation process transforms the output of the nonlinear transformation part using the F-function in each of r rounds, and the F-function performs the linear transformation part according to a matrix $M_i$, where the matrix $M_i$ is a m×m square matrix whose elements are on an extension field of degree 2, $GF(2^n)$, defined by an irreducible polynomial of degree n, wherein in each round, the matrix $M_i$ satisfies the following condition:

when parameters are defined such that
for a mapping $\theta: \{0,1\}^{na} \to \{0,1\}^{nb}$ which performs a linear transformation from n×a bit data into n×b-bit data, the number of branches $B(\theta)$ is defined by $$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BD_1$, $BD_2$, and $BD_3$ are defined by $$BD_1 = \min\{B(M_i) | 1 \leq i \leq r\}$$

$$BD_2 = \min\{B(M_i|M_{i+2}) | 1 \leq i \leq r-2\}, \text{ and}$$

$$BD_3 = \min\{B(M_i|M_{i+2}M_{i+4}) | 1 \leq i \leq r-4\}$$

where $B(M)$ denotes the number of branches of a matrix M, and A|B denotes a matrix obtained by connecting matrices A and B, the matrix $M_i$ is determined so that $BD_1$, $BD_2$ and $BD_3$ all are equal to or greater than 3.

5. A computer-implemented cryptographic processing method for executing, by a processor, a cryptographic process using a common key block structure, comprising the step of:

executing an SPN-type F-function including a nonlinear transformation part and a linear transformation part repeatedly over r rounds, wherein:
an input to the nonlinear transformation part has a length of 2m×n bits, where m and n are integers, an output from the nonlinear transformation part has a length of m×n bits, the linear transformation process transforms the output of the nonlinear transformation part using the F-function in each of r rounds, and the F-function performs the linear transformation part according to a matrix $M_i$, where the matrix $M_i$ is a m×m square matrix whose elements are on an extension field of degree 2, $GF(2^n)$, defined by an irreducible polynomial of degree n, wherein in each round, the matrix $M_i$ satisfies the following condition:

when parameters are defined such that
for a mapping $\theta: \{0,1\}^{na} \to \{0,1\}^{nb}$ which performs a linear transformation from n×a bit data into n×b-bit data, the number of branches $B(\theta)$ is defined by $$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BL_2$ is defined by $$BL_2 = \min\{B({}^tM^{-1}_i|{}^tM^{-1}_{i+2}) | 1 \leq i \leq r-2\}$$

where $B(M)$ denotes the number of branches of a matrix M, and ${}^tM$ denotes a transposed matrix of M, the matrix $M_i$ is determined so that $BL_2$ is equal to or greater than 3.

6. A computer program residing on a non-transitory computer-readable medium executable on a computer to perform a cryptographic process using a common key block structure, comprising the step of:

executing an SPN-type F-function including a nonlinear transformation part and a linear transformation part repeatedly over r rounds, wherein:
an input to the nonlinear transformation part has a length of 2m×n bits, where m and n are integers, an output from the nonlinear transformation part has a length of m×n bits, the linear transformation process transforms the output of the nonlinear transformation part using the F-function in each of r rounds, and the F-function performs the linear transformation part according to a matrix $M_i$, where the matrix $M_i$ is a m×m square matrix whose elements are on an extension field of degree 2, $GF(2^n)$, defined by an irreducible polynomial of degree n, wherein in each round, the matrix $M_i$ satisfies the following condition:

when parameters are defined such that
for a mapping $\theta: \{0,1\}^{na} \to \{0,1\}^{nb}$ which performs a linear transformation from n×a bit data into n×b-bit data, the number of branches $B(\theta)$ is defined by $$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BD_1$, $BD_2$, and $BD_3$ are defined by $$BD_1 = \min\{B(M_i) | 1 \leq i \leq r\}$$

$$BD_2 = \min\{B(M_i|M_{i+2}) | 1 \leq i \leq r-2\}, \text{ and}$$

$$BD_3 = \min\{B(M_i|M_{i+2}M_{i+4}) | 1 \leq i \leq r-4\}$$

where $B(M)$ denotes the number of branches of a matrix M, and A|B denotes a matrix obtained by connecting matrices A and B, the matrix $M_i$ s determined so that $BD_1$, $BD_2$ and $BD_3$ all are equal to or greater than 3.

7. A computer program residing on a non-transitory computer-readable medium executable on a computer to perform a cryptographic process using a common key block structure, comprising the step of:

executing an SPN-type F-function including a nonlinear transformation part and a linear transformation part repeatedly over r rounds, wherein:
an input to the nonlinear transformation part has a length of 2m×n bits, where m and n are integers, an output from the nonlinear transformation part has a length of m×n bits, the linear transformation process transforms the output of the nonlinear transformation part using the F-function in each of r rounds, and the F-function performs the linear transformation part according to a matrix $M_i$, where the matrix $M_i$ is a m×m square matrix whose elements are on an extension field of degree 2, $GF(2^n)$, defined by an irreducable polynomial of degree n, wherein in each round, the matrix $M_i$ satisfies the following condition:

when parameters are defined such that for a mapping $\theta$: $\{0, 1\}^{na} \to \{0, 1\}^{nb}$ which performs a linear transformation from n×a bit data into n×b-bit data, the number of branches $B(\theta)$ is defined by $$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, a mapping $\theta$ satisfying $B(\theta) = b+1$ is defined as an optimal diffusion mapping, where $B(\theta)$ is the number of branches defined above, and $BL_2$ is defined by $$BL_2 = \min\{B(^tM^{-1}_i|^tM^{-1}_{i+2}) | 1 \leq i \leq r-2\}$$

where B(M) denotes the number of branches of a matrix M, and $^tM$ denotes a transposed matrix of M, the matrix $M_i$ is determined so that $BL_2$ is equal to or greater than 3.

8. A computer-implemented method, performed by a processor, for determining a matrix $M_i$ satisfying a constraint condition for use in a linear transformation part of a cryptographic process, wherein:

the matrix $M_i$ is a m×m square matrix whose elements are on an extension field of degree 2, $GF(2^n)$, defined by an irreducable polynomial of degree n, and wherein the constraint condition imposed on matrices used in the linear transformation process is given as follows:

when parameters are defined such that for the matrix $M_i$ implementing a mapping $\theta$: $\{0, 1\}^{na} \to \{0, 1\}^{nb}$ which performs a linear transformation from n×a bit data into n×b-bit data in the linear transformation part using an F-function in each of r rounds, the number of branches $B(\theta)$ is defined by $$B(\theta) = \min_{\alpha \neq 0}\{hw_n(\alpha) + hw_n(\theta(\alpha))\}$$

where $\min_{\alpha \neq 0}\{X_\alpha\}$ denotes a minimum value of all values of $X_\alpha$ satisfying $\alpha \neq 0$, and $hw_n(Y)$ is a function which splits a given bit string Y into n-bit elements and returns the number of non-zero elements including at least one non-zero bit, the mapping $\theta$ satisfying $B(\theta) = b+1$ is defined as an optimal diffusion mapping, where $B(\theta)$ is the number of branches defined above, and $BD_1$ and $BD_2$ are defined by $$BD_1 = \min\{B(M_i) | 1 \leq i \leq r\}$$

$$BD_2 = \min\{B(M_i|M_{i+2}) | 1 \leq i \leq r-2\}$$

where B(M) denotes the number of branches of a matrix M, and A|B denotes a matrix obtained by connecting matrices A and B, and determining the matrix $M_i$ so that $BD_1$ and $BD_2$ are both equal to or greater than 3.

* * * * *